US010700891B2

United States Patent
Hao et al.

(10) Patent No.: US 10,700,891 B2
(45) Date of Patent: Jun. 30, 2020

(54) METHOD FOR IMPLEMENTING SERVICE CHAIN, DEVICE, AND SYSTEM

(71) Applicant: HUAWEI TECHNOLOGIES CO., LTD., Shenzhen, Guangdong (CN)

(72) Inventors: Weiguo Hao, Nanjing (CN); Qiandeng Liang, Nanjing (CN); Shibi Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 284 days.

(21) Appl. No.: 15/835,603

(22) Filed: Dec. 8, 2017

(65) Prior Publication Data
US 2018/0102919 A1 Apr. 12, 2018

Related U.S. Application Data

(63) Continuation of application No. PCT/CN2015/081170, filed on Jun. 10, 2015.

(51) Int. Cl.
*H04L 12/46* (2006.01)
*H04L 12/24* (2006.01)
(Continued)

(52) U.S. Cl.
CPC ...... *H04L 12/4633* (2013.01); *H04L 12/4641* (2013.01); *H04L 41/50* (2013.01);
(Continued)

(58) Field of Classification Search
CPC . H04L 12/4633; H04L 12/4641; H04L 41/50; H04L 45/306; H04L 45/38; H04L 45/64; H04L 47/2441
See application file for complete search history.

(56) References Cited

U.S. PATENT DOCUMENTS 8,830,834 B2 9/2014 Sharma et al.
2003/0202469 A1* 10/2003 Cain ........................ H04J 1/16
(Continued)

FOREIGN PATENT DOCUMENTS

| CN | 101227248 A | 7/2008 |
| CN | 101588288 A | 11/2009 |

(Continued)

OTHER PUBLICATIONS

Chinese Office Action issued in Chinese Application No. 201580001752.2 dated Mar. 8, 2019, 25 pages.
(Continued)

*Primary Examiner* — Ronald B Abelson
(74) *Attorney, Agent, or Firm* — Fish & Richardson P.C.

(57) ABSTRACT

A method of implementing a service chain in a service chain-enabled domain network includes: receiving, by an intermediate service node (SN), an extended first Border Gateway Protocol (BGP) packet from a downstream SN that is on a service chain path and immediately adjacent to the intermediate SN, the extended first BGP packet including a service chain path identifier identifying the service chain path and a first service chain path including a service chain path from an ingress SN to the intermediate SN, determining an upstream SN that is on the first service chain path and immediately adjacent to the intermediate SN, and sending an extended second BGP packet to the upstream SN, the extended second BGP packet including the service chain path identifier and a second service chain path including a service chain path from the ingress SN to the upstream SN.

15 Claims, 12 Drawing Sheets

(51) Int. Cl.
*H04L 12/735* (2013.01)
*H04L 12/721* (2013.01)
*H04L 12/715* (2013.01)
*H04L 12/851* (2013.01)
*H04L 12/725* (2013.01)

(52) U.S. Cl.
CPC ............ *H04L 45/306* (2013.01); *H04L 45/38* (2013.01); *H04L 45/64* (2013.01); *H04L 47/2441* (2013.01)

(56) References Cited

U.S. PATENT DOCUMENTS

| | | |
|---|---|---|
| 2013/0163594 A1 | 6/2013 | Sharma et al. |
| 2014/0280836 A1 | 9/2014 | Kumar et al. |
| 2014/0362857 A1 | 12/2014 | Guichard et al. |
| 2015/0003455 A1 | 1/2015 | Haddad et al. |
| 2015/0156035 A1 | 6/2015 | Foo et al. |
| 2016/0134472 A1 | 5/2016 | Guan et al. |

FOREIGN PATENT DOCUMENTS

| | | |
|---|---|---|
| CN | 102006218 A | 4/2011 |
| CN | 102143077 A | 8/2011 |
| CN | 103491129 A | 1/2014 |
| CN | 104283891 A | 1/2015 |
| CN | 104521195 A | 4/2015 |

OTHER PUBLICATIONS

Extended European Search Report issued in European Application No. 15894614.5 dated May 8, 2018, 8 pages.

P. Calhoun et al, "Diameter Base Protocol", Network Working Group, RFC 3588, Category: Standards Track, Sep. 2003, 115 pages.

International Search Report and Written Opinion issued in International Application No. PCT/CN2015/081170 dated Feb. 24, 2016; 24 pages.

* cited by examiner

METHOD FOR IMPLEMENTING SERVICE CHAIN, DEVICE, AND SYSTEM

CROSS-REFERENCE TO RELATED APPLICATIONS

This application is a continuation of International Application No. PCT/CN2015/081170, filed on Jun. 10, 2015, the disclosure of which is hereby incorporated by reference in its entirety.

TECHNICAL FIELD

The present invention relates to the field of communications technologies, and specifically, to a method for implementing a service chain, a device, and a system.

BACKGROUND

In mobile, fixed broadband, and data center application fields, there is a requirement for sequentially concatenating multiple value-added services for a specific application service flow of a specific user. For example, in a mobile or fixed broadband application, for an HTTP (Hypertext transfer protocol, Hypertext Transfer Protocol) or web (web page) Internet access service flow, three value-added services, namely, content filtering, a cache service, and a firewall, need to be sequentially concatenated before Internet (Internet, Internet) access. For a video service flow, only two value-added services, namely, a cache service and a firewall, need to be sequentially concatenated without content filtering. For an encrypted service flow, only a firewall value-added service is required. Likewise, there is also a similar application requirement in a service chain scenario in a data center application. For example, for some service flows in a data center, two value-added services, namely, a firewall and wide area network application acceleration, need to be sequentially concatenated.

Value-added services are concatenated to form a service chain (service chain), and applied as a whole to traffic of a user that subscribes to the services. Properly orchestrating and managing the service chain help an operator quickly deploy and apply a new type of service in a network and quickly provide or change a service template subscribed to by the user.

Currently, to implement a service chain, a service chain orchestrator generally delivers policy routing information, piece by piece according to a sequence of service nodes (Service Node, SN) that the service needs to pass through, to each service node on the service chain path separately by using a centralized controller or a conventional network management system, and even to a router on an intermediate non-service node, to ensure end-to-end smoothness of a flow to which the service chain is applied.

In this service chain implementation controlled and managed in a centralized manner, a route reachability status of each adjacent service node on a service chain forwarding path needs to be monitored, and multipoint control and coordination need to be performed on multiple SNs on the service chain forwarding path to ensure that the flow on the service chain is smooth. Therefore, load of a centralized control and management device is relatively heavy, and service chain deployment is relatively difficult.

SUMMARY

Embodiments of the present invention provide a method for implementing a service chain, a device, and a system to resolve a technical problem that load of a centralized control and management device is relatively heavy and that service chain deployment is relatively difficult in an existing service chain implementation.

According to a first aspect of the present invention, a method for implementing a service chain is provided and used in a service chain-enabled domain network, where service nodes SNs and a service chain path from an ingress SN to an egress SN through an intermediate SN are deployed in the service chain-enabled domain network, the SNs include the ingress SN, the intermediate SN, and the egress SN, and the method includes:

receiving, by the intermediate SN, an extended first Border Gateway Protocol BGP packet sent by a downstream SN that is on the service chain path and immediately adjacent to the intermediate SN, where the extended first BGP packet includes the service chain path identifier and the first service chain path, the service chain path identifier is used to identify the service chain path, and the first service chain path is a path including a service chain path from the ingress SN to the intermediate SN; and determining, by the intermediate SN, an upstream SN that is on the first service chain path and immediately adjacent to the intermediate SN; and sending, by the intermediate SN, an extended second BGP packet to the upstream SN, where the extended second BGP packet includes the service chain path identifier and a second service chain path, and the second service chain path is a path including a service chain path from the ingress SN to the upstream SN.

With reference to the first aspect, in a first possible implementation of the first aspect, that the first service chain path is a path including a service chain path from the ingress SN to the intermediate SN includes: the first service chain path is the service chain path from the ingress SN to the intermediate SN; and correspondingly, that the second service chain path is a path including a service chain path from the ingress SN to the upstream SN includes: the second service chain path is the service chain path from the ingress SN to the upstream SN.

With reference to the first aspect, in a second possible implementation of the first aspect, that the first service chain path is a path including a service chain path from the ingress SN to the intermediate SN includes: the first service chain path is the service chain path from the ingress SN to the egress SN; and correspondingly, that the second service chain path is a path including a service chain path from the ingress SN to the upstream SN includes: the second service chain path is the service chain path from the ingress SN to the egress SN.

With reference to any one of the first aspect, or the first and the second possible implementations of the first aspect, in a third possible implementation of the first aspect, after the receiving, by the intermediate SN, an extended first BGP packet sent by a downstream SN that is on the service chain path and immediately adjacent to the intermediate SN, the method further includes: establishing, by the intermediate SN, a first tunnel from the intermediate SN to the downstream SN with the downstream SN, and linking the first tunnel to a second tunnel to form one tunnel according to the service chain path identifier, where the second tunnel is a tunnel that is from the upstream SN to the intermediate SN and established by the upstream SN with the intermediate SN.

With reference to any one of the first aspect, or the first to the third possible implementations of the first aspect, in a fourth possible implementation of the first aspect, the extended first BGP packet further includes a tunnel type, the tunnel type is a label switched path LSP tunnel, and the establishing, by the intermediate SN, a first tunnel from the intermediate SN to the downstream SN with the downstream SN, and linking the first tunnel to a second tunnel to form one tunnel according to the service chain path identifier, where the second tunnel is a tunnel that is from the upstream SN to the intermediate SN and established by the upstream SN with the intermediate SN, includes:

obtaining, by the intermediate SN, a first label from the extended first BGP packet, where the first label is a label allocated by the downstream SN to the service chain path identifier, and establishing, by the intermediate SN, the first tunnel with the downstream SN, where the first tunnel is an LSP tunnel from the intermediate SN to the downstream SN;

allocating, by the intermediate SN, a second label to the service chain path identifier, and adding the second label to the extended second BGP packet, where the second label is used by the upstream SN to establish the second tunnel with the intermediate SN, and the second tunnel is an LSP tunnel from the upstream SN to the intermediate SN; and associating, by the intermediate SN, the second label with the first label according to the service chain path identifier, and generating a label forwarding table, where the second label is used as an incoming label, and the first label is used as an outgoing label, so that the first tunnel is linked to the second tunnel to form one tunnel.

With reference to any one of the first aspect, or the first to the fourth possible implementations of the first aspect, in a fifth possible implementation of the first aspect, the extended first BGP packet carries extended network layer reachability information NLRI, the extended NLRI includes a length field, a label field, and a service chain policy field, the label field carries the first label, and the service chain policy field includes a service chain path identifier field carrying the service chain path identifier and a service chain path sequence field carrying the first service chain path.

With reference to the fifth possible implementation of the first aspect, in a sixth possible implementation of the first aspect, the service chain policy field further includes a tunnel type field carrying the LSP tunnel type and/or a service chain policy decision point identifier field carrying a service chain policy decision point identifier.

With reference to any one of the first aspect, or the first to the third possible implementations of the first aspect, in a seventh possible implementation of the first aspect, the extended first BGP packet further includes a tunnel type, the tunnel type is a network virtualization over layer 3 NVO3 tunnel, and the establishing, by the intermediate SN, a first tunnel from the intermediate SN to the downstream SN with the downstream SN, and linking the first tunnel to a second tunnel to form one tunnel according to the service chain path identifier, where the second tunnel is a tunnel that is from the upstream SN to the intermediate SN and established by the upstream SN with the intermediate SN, includes:

obtaining, by the intermediate SN, a first tunnel destination identifier from the extended first BGP packet, where the first tunnel destination identifier includes an IP address of the downstream SN and a first local service chain path identifier allocated by the downstream SN to the service chain path, and establishing, by the intermediate SN, the first tunnel with the downstream SN, where the first tunnel is an NVO3 tunnel from the intermediate SN to the downstream SN;

allocating, by the intermediate SN, a second local service chain path identifier to the service chain path, generating a second tunnel destination identifier according to the second local service chain path identifier, and adding the second tunnel destination identifier to the extended second BGP packet, where the second tunnel destination identifier includes an IP address of the intermediate SN and the second local service chain path identifier, the second tunnel destination identifier is used by the upstream SN to establish the second tunnel with the intermediate SN, and the second tunnel is an NVO3 tunnel from the upstream SN to the intermediate SN; and associating, by the intermediate SN, the second tunnel destination identifier with the first tunnel destination identifier according to the service chain path identifier, and generating a forwarding information table, so that the first tunnel is linked to the second tunnel to form one tunnel.

With reference to the seventh possible implementation of the first aspect, in an eighth possible implementation of the first aspect, the NVO3 tunnel is specifically a virtual extensible local area network VXLAN tunnel or a network virtualization using generic routing encapsulation NVGRE tunnel, and the method further includes:

receiving, by the intermediate SN, a service data packet of the service chain that is sent by the upstream SN, terminating a tunnel encapsulation header of the second tunnel in the service data packet, and reencapsulating a tunnel encapsulation header of the first tunnel, where a specific field of the tunnel encapsulation header of the first tunnel is filled with the first local service chain path identifier, where when the tunnel type is a VXLAN tunnel, the filled specific field is a VXLAN network identifier VNI field of a VXLAN header; or when the tunnel type is an NVGRE tunnel, the filled specific field is a virtual subnet identifier VSI field of an NVGRE header.

With reference to the first aspect, or the first, the second, the third, the seventh, or the eighth possible implementation of the first aspect, in a ninth possible implementation of the first aspect, the extended first BGP packet carries extended network layer reachability information NLRI, the extended NLRI includes a length field, a tunnel destination identifier field, and a service chain policy field, the tunnel destination identifier field includes at least a local service chain identifier field carrying the first local service chain path identifier and a destination IP address field carrying the IP address of the downstream SN, and the service chain policy field includes a service chain path identifier field carrying the service chain path identifier and a service chain path sequence field carrying the first service chain path.

With reference to the ninth possible implementation of the first aspect, in a tenth possible implementation of the first aspect, the service chain policy field further includes a tunnel type field carrying the NVO3 tunnel type and/or a service chain policy decision point identifier field carrying a service chain policy decision point identifier.

According to a second aspect of the present invention, a method for implementing a service chain is provided and used in a service chain-enabled domain network, where service nodes SNs and a service chain path from an ingress SN to an egress SN are deployed in the service chain-enabled domain network, the SNs include the ingress SN and the egress SN, and the method includes:

obtaining, by the egress SN, a service chain path identifier and a first service chain path, where the service chain path identifier is used to identify the service chain path, and the first service chain path is the service chain path from the ingress SN to the egress SN;

determining, by the egress SN, an upstream SN that is on the first service chain path and immediately adjacent to the egress SN; and sending, by the egress SN, an extended Border Gateway Protocol BGP packet to the upstream SN, where the extended BGP packet includes the service chain path identifier and a second service chain path, and the second service chain path is a path including a service chain path from the ingress SN to the upstream SN.

With reference to the second aspect, in a first possible implementation of the second aspect, that the second service chain path is a path including a service chain path from the ingress SN to the upstream SN includes: the second service chain path is the service chain path from the ingress SN to the upstream SN, or the second service chain path is the service chain path from the ingress SN to the egress SN.

With reference to the second aspect, or the first possible implementation of the second aspect, in a second possible implementation of the second aspect, the method further includes:

obtaining, by the egress SN, a tunnel type; and when the tunnel type is a label switched path LSP tunnel, allocating, by the egress SN, a label to the service chain path, and adding the label to the extended BGP packet; or when the tunnel type is a network virtualization over layer 3 NVO3 tunnel, allocating, by the egress SN, a local service chain path identifier to the service chain path, generating a tunnel destination identifier according to the local service chain path identifier and an IP address of the egress SN, and adding the tunnel destination identifier to the extended BGP packet.

With reference to any one of the second aspect, or the first and the second possible implementations of the second aspect, in a third possible implementation of the second aspect, the extended BGP packet carries extended network layer reachability information NLRI, the extended NLRI includes a length field, a label field, and a service chain policy field, the label field carries the label, and the service chain policy field includes a service chain path identifier field carrying the service chain path identifier and a service chain path sequence field carrying the second service chain path.

With reference to the third possible implementation of the second aspect, in a fourth possible implementation of the second aspect, the service chain policy field further includes a tunnel type field carrying the LSP tunnel type and/or a service chain policy decision point identifier field carrying the identifier for identifying a service chain policy decision point.

With reference to any one of the second aspect, or the first and the second possible implementations of the second aspect, in a fifth possible implementation of the second aspect, the extended BGP packet carries extended network layer reachability information NLRI, the extended NLRI includes a length field, a tunnel destination identifier field, and a service chain policy field, the tunnel destination identifier field includes at least a local service chain identifier field carrying the local service chain path identifier and a destination IP address field carrying an IP address of the downstream SN, and the service chain policy field includes a service chain path identifier field carrying the service chain path identifier and a service chain path sequence field carrying the second service chain path.

With reference to the fifth possible implementation of the second aspect, in a sixth possible implementation of the second aspect, the service chain policy field further includes a tunnel type field carrying the NVO3 tunnel type and/or a service chain policy decision point identifier field carrying the identifier for identifying a service chain policy decision point.

According to a third aspect of the present invention, a method for implementing a service chain is provided and used in a service chain-enabled domain network, where service nodes SNs and a service chain path from an ingress SN to an egress SN are deployed in the service chain-enabled domain network, the SNs include the ingress SN and the egress SN, and the method includes:

receiving, by the ingress SN, an extended BGP packet sent by a downstream SN that is on the service chain path and immediately adjacent to the ingress SN, where the extended BGP packet includes a service chain path identifier and a first service chain path, the service chain path identifier is used to identify the service chain path, and the first service chain path is a path including the ingress SN;

establishing, by the ingress SN, a tunnel from the ingress SN to the downstream SN with the downstream SN; and sending, by the ingress SN, a notification message to a service chain policy decision point after the tunnel is established successfully, where the notification message carries the service chain path identifier.

With reference to the third aspect, in a first possible implementation of the third aspect, that the first service chain path is a path including the ingress SN includes: the first service chain path is the ingress SN, or the first service chain path is the service chain path from the ingress SN to the egress SN.

With reference to the third aspect, or the first possible implementation of the third aspect, in a second possible implementation of the third aspect, the service chain-enabled domain network further includes a flow classifier, the flow classifier is an independent device, and the method further includes:

receiving, by the ingress SN, flow entry information sent by the service chain policy decision point, where the flow entry information includes information about the flow classifier; and disseminating, by the ingress SN, the extended BGP packet to the flow classifier, where the extended BGP packet is used by the flow classifier to establish a pull-in tunnel from the flow classifier to the ingress SN with the ingress SN.

With reference to the third aspect, or the first possible implementation of the third aspect, in a third possible implementation of the third aspect, the service chain-enabled domain network further includes a flow classifier, the flow classifier is integrated with the ingress SN, and the method further includes:

receiving, by the ingress SN, an association message delivered by the service chain policy decision point, where the association message includes an association relationship between the service chain path identifier and a flow steering rule; and steering, by the ingress SN, a flow of the service chain to the service chain path according to the association relationship.

With reference to the third aspect, or the first to the third possible implementations of the third aspect, in a fourth possible implementation of the third aspect, the extended BGP packet carries extended network layer reachability information NLRI, the extended NLRI includes a length field, a label field, and a service chain policy field, the label field carries the label, and the service chain policy field includes a service chain path identifier field carrying the service chain path identifier and a service chain path sequence field carrying the first service chain path.

With reference to the fourth possible implementation of the third aspect, in a fifth possible implementation of the third aspect, the service chain policy field further includes a tunnel type field carrying the LSP tunnel type and/or a service chain policy decision point identifier field carrying the service chain policy decision point identifier.

With reference to any one of the third aspect, or the first to the third possible implementations of the third aspect, in a sixth possible implementation of the third aspect, the extended BGP packet carries extended network layer reachability information NLRI, the extended NLRI includes a length field, a tunnel destination identifier field, and a service chain policy field, the tunnel destination identifier field includes at least a local service chain identifier field carrying the local service chain path identifier and a destination IP address field carrying an IP address of the downstream SN, and the service chain policy field includes a service chain path identifier field carrying the service chain path identifier and a service chain path sequence field carrying the first service chain path.

With reference to the sixth possible implementation of the third aspect, in a seventh possible implementation of the third aspect, the service chain policy field further includes a tunnel type field carrying the NVO3 tunnel type and/or a service chain policy decision point identifier field carrying the service chain policy decision point identifier.

According to a fourth aspect of the present invention, a method for implementing a service chain is provided and is used in a service chain-enabled domain network, where a service chain policy decision point, service nodes SNs, and a service chain path that is from an ingress SN to an egress SN and orchestrated by the service chain policy decision point are deployed in the service chain-enabled domain network, the SNs include the ingress SN and the egress SN, and the method includes:

orchestrating, by the service chain policy decision point, a service chain according to a requirement of a service chain service, and generating a service chain policy of the service chain, where the service chain policy is used to indicate information required for establishing a tunnel from the ingress SN of the service chain to the egress SN of the service chain and service processing, the service chain policy includes a service chain path identifier of the service chain and a service chain path of the service chain, and the service chain path is used to indicate a chain path from the ingress SN to the egress SN on the service chain; and sending, by the service chain policy decision point, the service chain policy to the egress SN of the service chain according to the service chain path.

With reference to the fourth aspect, in a first possible implementation of the fourth aspect, the service chain policy decision point receives a notification message that is sent by the ingress SN and indicates that the tunnel is established successfully, where the notification message carries the service chain path identifier.

With reference to the first possible implementation of the fourth aspect, in a second possible implementation of the fourth aspect, the service chain-enabled domain network further includes a flow classifier, and after the receiving a notification message that is sent by the ingress SN and indicates that the tunnel is established successfully, the method further includes:

delivering, by the service chain policy decision point, flow entry information to the ingress SN, where the flow entry information includes information about the flow classifier, and the flow entry information is forwarded by the ingress SN to the flow classifier and used to establish a pull-in tunnel from the flow classifier to the ingress SN.

With reference to the first possible implementation of the fourth aspect, in a third possible implementation of the fourth aspect, the service chain-enabled domain network further includes a flow classifier, the flow classifier is integrated with the ingress SN, and after the receiving a notification message that is sent by the ingress SN and indicates that the tunnel is established successfully, the method further includes:

delivering, by the service chain policy decision point, an association message to the ingress SN, where the association message includes an association relationship between the service chain path identifier and a flow steering rule, and the association message is used by the ingress SN to steer a flow of the service chain to the service chain path.

According to a fifth aspect of the present invention, a service node SN is provided, where the SN is used as an intermediate SN and used in a service chain-enabled domain network, an ingress SN, the intermediate SN, an egress SN, and a service chain path from the ingress SN to the egress SN through the intermediate SN are deployed in the service chain-enabled domain network, and the intermediate SN includes:

a receiving module, configured to receive an extended first Border Gateway Protocol BGP packet sent by a downstream SN that is on the service chain path and immediately adjacent to the intermediate SN, where the extended first BGP packet includes the service chain path identifier and the first service chain path, the service chain path identifier is used to identify the service chain path, and the first service chain path is a path including a service chain path from the ingress SN to the intermediate SN;

a determining module, configured to determine an upstream SN that is on the first service chain path and immediately adjacent to the SN; and a sending module, configured to send an extended second BGP packet to the upstream SN, where the extended second BGP packet includes the service chain path identifier and a second service chain path, and the second service chain path is a path including a service chain path from the ingress SN to the upstream SN.

With reference to the fifth aspect, in a first possible intermediate SN of the fifth aspect, that the first service chain path is a path including a service chain path from the ingress SN to the intermediate SN includes: the first service chain path is the service chain path from the ingress SN to the intermediate SN; and correspondingly, that the second service chain path is a path including a service chain path from the ingress SN to the upstream SN includes: the second service chain path is the service chain path from the ingress SN to the upstream SN.

With reference to the fifth aspect, or the first possible intermediate SN of the fifth aspect, in a second possible intermediate SN of the fifth aspect, that the first service chain path is a path including a service chain path from the ingress SN to the intermediate SN includes: the first service chain path is the service chain path from the ingress SN to the egress SN; and correspondingly, that the second service chain path is a path including a service chain path from the ingress SN to the upstream SN includes: the second service chain path is the service chain path from the ingress SN to the egress SN.

With reference to any one of the fifth aspect, or the first and the second possible intermediate SNs of the fifth aspect, in a third possible intermediate SN of the fifth aspect, the intermediate SN further includes:

a tunneling module, configured to: after the receiving module receives the extended first BGP packet, establish, by the tunneling module, a first tunnel from the intermediate SN to the downstream SN with the downstream SN, and link the first tunnel to a second tunnel to form one tunnel according to the service chain path identifier, where the second tunnel is a tunnel that is from the upstream SN to the intermediate SN and established by the upstream SN with the intermediate SN.

With reference to any one of the fifth aspect, or the first to the third possible intermediate SNs of the fifth aspect, in a fourth possible intermediate SN of the fifth aspect, the extended first BGP packet further includes a tunnel type, the tunnel type is a label switched path LSP tunnel, and the tunneling module includes:

an obtaining unit, configured to obtain a first label from the extended first BGP packet, where the first label is a label allocated by the downstream SN to the service chain path identifier;

an establishing unit, configured to establish the first tunnel with the downstream SN, where the first tunnel is an LSP tunnel from the intermediate SN to the downstream SN;

an allocation unit, configured to allocate a second label to the service chain path identifier, and add the second label to the extended second BGP packet, where the second label is used by the upstream SN to establish the second tunnel with the intermediate SN, and the second tunnel is an LSP tunnel from the upstream SN to the intermediate SN; and an association unit, configured to associate the second label with the first label according to the service chain path identifier, and generate a label forwarding table, where the second label is used as an incoming label, and the first label is used as an outgoing label, so that the first tunnel is linked to the second tunnel to form one tunnel.

With reference to any one of the fifth aspect, or the first to the fourth possible intermediate SNs of the fifth aspect, in a fifth possible intermediate SN of the fifth aspect, the extended first BGP packet carries extended network layer reachability information NLRI, the extended NLRI includes a length field, a label field, and a service chain policy field, the label field carries the first label, and the service chain policy field includes a service chain path identifier field carrying the service chain path identifier and a service chain path sequence field carrying the first service chain path.

With reference to the fifth possible intermediate SN of the fifth aspect, in a sixth possible intermediate SN of the fifth aspect, the service chain policy field further includes a tunnel type field carrying the LSP tunnel type and/or a service chain policy decision point identifier field carrying a service chain policy decision point identifier.

With reference to any one of the fifth aspect, or the first to the third possible intermediate SNs of the fifth aspect, in a seventh possible intermediate SN of the fifth aspect, the extended first BGP packet further includes a tunnel type, the tunnel type is a network virtualization over layer 3 NVO3 tunnel, and the tunneling module includes:

an obtaining unit, configured to obtain a first tunnel destination identifier from the extended first BGP packet, where the first tunnel destination identifier includes an IP address of the downstream SN and a first local service chain path identifier allocated by the downstream SN to the service chain path;

an establishing unit, configured to establish the first tunnel with the downstream SN, where the first tunnel is an NVO3 tunnel from the intermediate SN to the downstream SN;

an allocation unit, configured to allocate a second local service chain path identifier to the service chain path, generate a second tunnel destination identifier according to the second local service chain path identifier, and add the second tunnel destination identifier to the extended second BGP packet, where the second tunnel destination identifier includes an IP address of the intermediate SN and the second local service chain path identifier, the second tunnel destination identifier is used by the upstream SN to establish the second tunnel with the intermediate SN, and the second tunnel is an NVO3 tunnel from the upstream SN to the intermediate SN; and an association unit, configured to associate the second tunnel destination identifier with the first tunnel destination identifier according to the service chain path identifier, and generate a forwarding information table, so that the first tunnel is linked to the second tunnel to form one tunnel.

With reference to the seventh possible intermediate SN of the fifth aspect, in an eighth possible intermediate SN of the fifth aspect, the NVO3 tunnel is specifically a virtual extensible local area network VXLAN tunnel or a network virtualization using generic routing encapsulation NVGRE tunnel, and the intermediate SN further includes:

the receiving module receives a service data packet of the service chain that is sent by the upstream SN, terminates a tunnel encapsulation header of the second tunnel in the service data packet, and reencapsulates a tunnel encapsulation header of the first tunnel, where a specific field of the tunnel encapsulation header of the first tunnel is filled with the first local service chain path identifier, where when the tunnel type is a VXLAN tunnel, the filled specific field is a VXLAN network identifier VNI field of a VXLAN header; or when the tunnel type is an NVGRE tunnel, the filled specific field is a virtual subnet identifier VSI field of an NVGRE header.

With reference to the fifth aspect, or the first, the second, the third, the fourth, the seventh, or the eighth possible intermediate SN of the fifth aspect, in a ninth possible intermediate SN of the fifth aspect, the extended first BGP packet carries extended network layer reachability information NLRI, the extended NLRI includes a length field, a tunnel destination identifier field, and a service chain policy field, the tunnel destination identifier field includes at least a local service chain identifier field carrying the first local service chain path identifier and a destination IP address field carrying the IP address of the downstream SN, and the service chain policy field includes a service chain path identifier field carrying the service chain path identifier and a service chain path sequence field carrying the first service chain path.

With reference to the ninth possible intermediate SN of the fifth aspect, in a tenth possible intermediate SN of the fifth aspect, the service chain policy field further includes a tunnel type field carrying the NVO3 tunnel type and/or a service chain policy decision point identifier field carrying a service chain policy decision point identifier.

According to a sixth aspect of the present invention, a service node SN is provided, where the SN is used as an egress SN and used in a service chain-enabled domain network, an ingress SN, the egress SN, and a service chain path from the ingress SN to the egress SN are deployed in the service chain-enabled domain network, and the egress SN includes:

an obtaining module, configured to obtain a service chain path identifier and a first service chain path, where the service chain path identifier is used to identify the service chain path, and the first service chain path is the service chain path from the ingress SN to the egress SN;

a determining module, configured to determine an upstream SN that is on the first service chain path and immediately adjacent to the egress SN; and a sending module, configured to send an extended Border Gateway Protocol BGP packet to the upstream SN, where the extended BGP packet includes the service chain path identifier and a second service chain path, and the second service chain path is a path including a service chain path from the ingress SN to the upstream SN.

With reference to the sixth aspect, in a first possible egress SN of the sixth aspect, that the second service chain path is a path including a service chain path from the ingress SN to the upstream SN includes: the second service chain path is the service chain path from the ingress SN to the upstream SN, or the second service chain path is the service chain path from the ingress SN to the egress SN.

With reference to the sixth aspect, or the first possible egress SN of the sixth aspect, in a second possible egress SN of the sixth aspect, the obtaining module is further configured to obtain a tunnel type; and the egress SN further includes a tunneling module, where when the tunnel type is a label switched path LSP tunnel, the tunneling module allocates a label to the service chain path, and adds the label to the extended BGP packet; or when the tunnel type is a network virtualization over layer 3 NVO3 tunnel, the tunneling module allocates a local service chain path identifier to the service chain path, generates a tunnel destination identifier according to the local service chain path identifier and an IP address of the egress SN, and adds the tunnel destination identifier to the extended BGP packet.

With reference to any one of the sixth aspect, or the first and the second possible egress SNs of the sixth aspect, in a third possible egress SN of the sixth aspect, the extended BGP packet carries extended network layer reachability information NLRI, the extended NLRI includes a length field, a label field, and a service chain policy field, the label field carries the label, and the service chain policy field includes a service chain path identifier field carrying the service chain path identifier and a service chain path sequence field carrying the second service chain path.

With reference to the third possible egress SN of the sixth aspect, in a fourth possible egress SN of the sixth aspect, the service chain policy field further includes a tunnel type field carrying the LSP tunnel type and/or a service chain policy decision point identifier field carrying a service chain policy decision point identifier.

With reference to any one of the sixth aspect, or the first and the second possible egress SNs of the sixth aspect, in a fifth possible egress SN of the sixth aspect, the extended BGP packet carries extended network layer reachability information NLRI, the extended NLRI includes a length field, a tunnel destination identifier field, and a service chain policy field, the tunnel destination identifier field includes at least a local service chain identifier field carrying the local service chain path identifier and a destination IP address field carrying an IP address of the downstream SN, and the service chain policy field includes a service chain path identifier field carrying the service chain path identifier and a service chain path sequence field carrying the second service chain path.

With reference to the fifth possible egress SN of the sixth aspect, in a sixth possible egress SN of the sixth aspect, the service chain policy field further includes a tunnel type field carrying the NVO3 tunnel type and/or a service chain policy decision point identifier field carrying a service chain policy decision point identifier.

According to a seventh aspect of the present invention, a service node SN is provided, where the SN is used as an ingress SN and used in a service chain-enabled domain network, the ingress SN, an egress SN, and a service chain path from the ingress SN to the egress SN are deployed in the service chain-enabled domain network, and the ingress SN includes:

a receiving module, configured to receive an extended BGP packet sent by a downstream SN that is on the service chain path and immediately adjacent to the ingress SN, where the extended BGP packet includes a service chain path identifier and a first service chain path, the service chain path identifier is used to identify the service chain path, and the first service chain path is a path including the ingress SN;

a tunneling module, configured to establish a tunnel from the ingress SN to the downstream SN with the downstream SN; and a sending module, configured to send a notification message to a service chain policy decision point after the tunnel is established successfully, where the notification message carries the service chain path identifier.

With reference to the seventh aspect, in a first possible ingress SN of the seventh aspect, that the first service chain path is a path including the ingress SN includes: the first service chain path is the ingress SN, or the first service chain path is the service chain path from the ingress SN to the egress SN.

With reference to the seventh aspect, or the first possible ingress SN of the seventh aspect, in a second possible ingress SN of the seventh aspect, the service chain-enabled domain network further includes a flow classifier, and the ingress SN further includes:

the receiving module receives flow entry information sent by the service chain policy decision point, where the flow entry information includes information about the flow classifier; and the sending module disseminates the extended BGP packet to the flow classifier, where the extended BGP packet is used by the flow classifier to establish a pull-in tunnel from the flow classifier to the ingress SN with the ingress SN.

With reference to the seventh aspect, or the first possible ingress SN of the seventh aspect, in a third possible ingress SN of the seventh aspect, the service chain-enabled domain network further includes a flow classifier, the flow classifier is integrated with the ingress SN, and the ingress SN further includes:

the receiving module receives an association message delivered by the service chain policy decision point, where the association message includes an association relationship between the service chain path identifier and a flow steering rule; and a traffic steering module, configured to steer a flow of the service chain to the service chain path according to the association relationship.

With reference to the seventh aspect, or the first to the third possible ingress SNs of the seventh aspect, in a fourth possible ingress SN of the seventh aspect, the extended BGP packet carries extended network layer reachability information NLRI, the extended NLRI includes a length field, a label field, and a service chain policy field, the label field carries the label, and the service chain policy field includes a service chain path identifier field carrying the service chain path identifier and a service chain path sequence field carrying the first service chain path.

With reference to the fourth possible ingress SN of the seventh aspect, in a fifth possible ingress SN of the seventh aspect, the service chain policy field further includes a tunnel type field carrying the LSP tunnel type and/or a service chain policy decision point identifier field carrying the service chain policy decision point identifier.

With reference to the seventh aspect, or the first to the third possible ingress SNs of the seventh aspect, in a sixth possible ingress SN of the seventh aspect, the extended BGP packet carries extended network layer reachability information NLRI, the extended NLRI includes a length field, a tunnel destination identifier field, and a service chain policy field, the tunnel destination identifier field includes at least a local service chain identifier field carrying the local service chain path identifier and a destination IP address field carrying an IP address of the downstream SN, and the service chain policy field includes a service chain path identifier field carrying the service chain path identifier and a service chain path sequence field carrying the first service chain path.

With reference to the sixth possible ingress SN of the seventh aspect, in a seventh possible ingress SN of the seventh aspect, the service chain policy field further includes a tunnel type field carrying the NVO3 tunnel type and/or a service chain policy decision point identifier field carrying the service chain policy decision point identifier.

According to an eighth aspect of the present invention, a service chain policy decision point is provided and used in a service chain-enabled domain network, where the service chain policy decision point includes:

a generation module, configured to orchestrate a service chain according to a requirement of a service chain service, and generate a service chain policy of the service chain, where the service chain policy is used to indicate information required for establishing a tunnel from an ingress SN of the service chain to an egress SN of the service chain and service processing, the service chain policy includes a service chain path identifier of the service chain and a service chain path of the service chain, and the service chain path is used to indicate a chain path from the ingress SN to the egress SN on the service chain; and a sending module, configured to send the service chain policy to the egress SN of the service chain according to the service chain path.

With reference to the eighth aspect, in a first possible service chain policy decision point of the eighth aspect, the service chain policy decision point further includes:

a receiving module, configured to receive a notification message that is sent by the ingress SN and indicates that the tunnel is established successfully, where the notification message carries the service chain path identifier.

With reference to the eighth aspect, or the first possible service chain policy decision point of the eighth aspect, in a second possible service chain policy decision point of the eighth aspect, the service chain-enabled domain network further includes a flow classifier; and after the receiving module receives the notification message, the sending module is further configured to send flow entry information to the ingress SN, where the flow entry information includes information about the flow classifier, and the flow entry information is forwarded by the ingress SN to the flow classifier and used to establish a pull-in tunnel from the flow classifier to the ingress SN.

With reference to the eighth aspect, or the first possible service chain policy decision point of the eighth aspect, in a third possible service chain policy decision point of the eighth aspect, the service chain-enabled domain network further includes a flow classifier, and the flow classifier is integrated with the ingress SN; and after the receiving module receives the notification message, the sending module is further configured to send an association message to the ingress SN, where the association message includes an association relationship between the service chain path identifier and a flow steering rule, and the association message is used by the ingress SN to steer a flow of the service chain to the service chain path.

According to a ninth aspect of the present invention, a service chain-enabled domain network system is provided, where the service chain-enabled domain network system includes a service chain policy decision point, an ingress service node SN, and an egress SN, where the service chain policy decision point is any service chain policy decision point according to the eighth aspect, the ingress SN is any ingress SN according to the seventh aspect, and the egress SN is any egress SN according to the sixth aspect.

With reference to the ninth aspect, in a first possible service chain-enabled domain network system of the ninth aspect, the service chain-enabled domain network system further includes an intermediate SN, where the intermediate SN is any intermediate SN according to the fifth aspect.

As can be seen from above, in the technical solutions of the embodiments of the present invention, after obtaining a service chain path identifier and a first service chain path, a service node SN determines an upstream SN that is on the first service chain path and immediately adjacent to the SN, and sends an extended BGP packet including the service chain path identifier and a second service chain path to the upstream SN, where the first service chain path is a path including a service chain path from the ingress SN to the intermediate SN, and the second service chain path is a path including a service chain path from the ingress SN to the upstream SN. Therefore, the following technical effects are achieved:

A service chain policy decision point only needs to deliver a service chain policy including the service chain path identifier and a service chain path to an egress SN of a service chain, the service chain policy may be disseminated to the ingress SN of the service chain, and a chain path of the service chain is automatically established. Therefore, automatic service chain deployment is implemented, a service chain deployment operation is simplified, and service chain deployment difficulty is reduced.

The service chain policy decision point only needs to interact with the egress SN, without delivering the service chain policy to each SN separately, monitoring a route reachability status of each service node, or performing multipoint control and coordination. This reduces objects that interact with the service chain policy decision point, and therefore reduces computation and processing load of the service chain policy decision point. Therefore, operation, administration and maintenance are simple, and extensibility is high.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
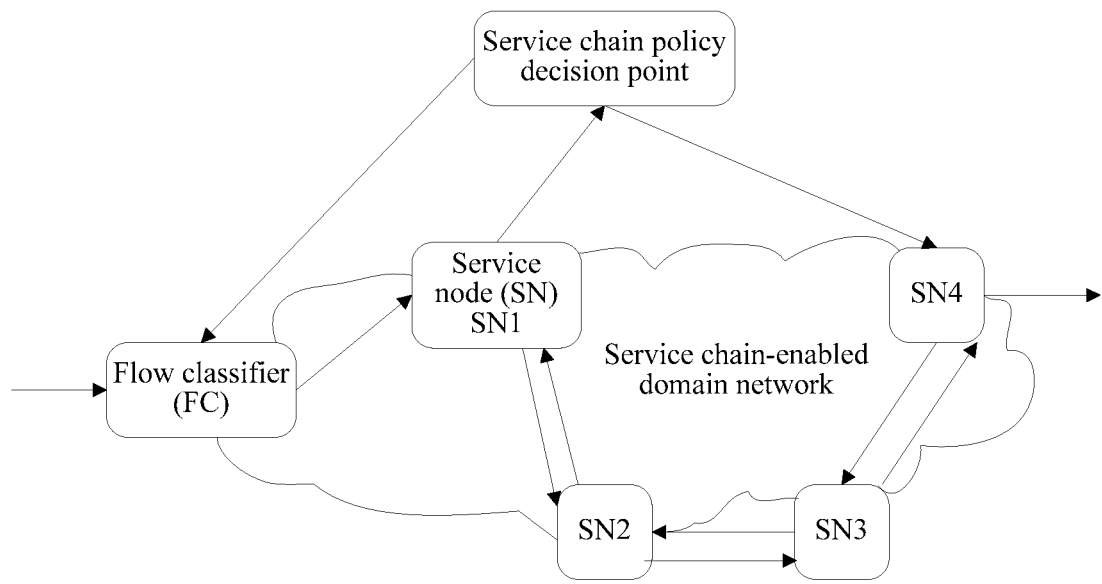
FIG. 1 is a schematic architecture diagram of a service chain-enabled domain network according to Embodiment 1 of the present invention.

Embodiments of the present invention provide a method for implementing a service chain, a device, and a system to provide a service chain solution featuring high extensibility, easy deployment, and simple operation, administration and maintenance. The solution can resolve a technical problem that load of a centralized control and management device is relatively heavy and that automatic deployment of a service chain is relatively difficult in a service chain implementation controlled and managed in a centralized manner in the prior art, and can further resolve a technical problem that load of a control and management channel is relatively heavy in the prior art.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the prior art, generally, a service chain implementation controlled and managed in a centralized manner is used. In this manner, a centralized control and management device separately delivers policy routing information to each service node on a service chain path to guide each service node on the service chain path in establishing a tunnel from an ingress SN to an egress SN. For example, assuming that the service chain path includes five SNs denoted by an SN1 to an SN5 respectively, where the SN1 is the ingress SN and the SN5 is the egress SN, the centralized control and management device needs to separately deliver policy routing information to the five SNs to guide any two immediately adjacent SNs in establishing a tunnel. For example, a tunnel is established between the SN1 and the SN2, a tunnel is established between the SN3 and the SN4, a tunnel is established between the SN2 and the SN3, and so on, until the SN1 to the SN5 are all connected by tunnels. After the SN1 used as the ingress SN establishes a tunnel with the SN2, a flow of the service chain is steered to the established tunnel.

During practice, it is found that the foregoing solution has the following disadvantages:

1. Tunnels are established non-sequentially, and as a result, the flow may be lost. For example, after the tunnel between the SN1 and the SN2 is established successfully, the flow is steered in. However, at this time, the tunnel between the SN2 and the SN3 may not be established yet. In this case, a flow loss risk may exist.

2. To avoid a flow loss, the centralized control and management device needs to perform multipoint control and coordination on the multiple SNs of the service chain to ensure that the flow of the service chain is steered in only after all tunnels from the ingress SN to the egress SN are established. As a result, load of the centralized control and management device is relatively heavy, and it is relatively difficult to automatically deploy the service chain.

3. In addition, because the centralized control and management device needs to perform multipoint control and coordination on the multiple SNs of the service chain, load of a control and management channel between the centralized control and management device and SNs is relatively heavy.

Therefore, the embodiments of the present invention provide a method for implementing a service chain, a device, and a system to resolve the technical problems that the load of the centralized control network management device is relatively heavy, and that it is relatively difficult to automatically deploy the service chain, and that the load of the control and management channel is relatively heavy in the existing service chain implementation.

The following provides detailed descriptions separately by using specific embodiments.

Embodiment 1

This embodiment of the present invention provides a method for implementing a service chain. The method is used in a service chain-enabled domain network (Service Chain-enabled Domain Network).

As shown in FIG. 1, FIG. 1 is a schematic architecture diagram of the service chain-enabled domain network. One or more service chain policy decision points and multiple service nodes (SN) configured to provide value-added services are generally deployed in the service chain-enabled domain network. A flow classifier may be further deployed in the service chain-enabled domain network.

An SN is configured to provide one or a group of specific valued-added services, for example, a firewall (FireWall) or deep packet inspection (Deep Packet inspection, DPI), and corresponds to a value-added service module. In addition, the SN needs to support BGP (Border Gateway Protocol, Border Gateway Protocol) and basic routing, addressing, and forwarding functions, and corresponds to a basic routing module. That is, the SN includes the value-added service module and the basic routing module. The two modules may be deployed on one logical/physical network element or different logical/physical network elements (requiring a logical direct connection). By default, it is required that the basic routing module of the SN can send, according to a service chain path identifier (ID) and/or service flow related metadata (MetaData), a flow to which the service chain is applied, to a value-added service module for processing, and can normally identify, after receiving the flow returned by the value-added service module, a service chain ID corresponding to the flow.

The service chain policy decision point (or referred to as a service chain controller) is a network device, configured to collect and manage information (for example, types of value-added services, service parameters, and statuses) about the service nodes and network layer reachability information (for example, a route status and a link status) in the service chain-enabled domain network according to a configuration or dynamically by using a protocol, and orchestrate the service nodes according to a requirement of a user to form one or more service chains. The requirement of the user may be reflected by a customized service template, a service node status and/or user service flow information (for example, a user identity, and an access location), and the like. The service chain may be specifically expressed as a sequence of network layer reachability identifiers (for example, IP addresses and/or VPN (virtual private network, virtual private network) instance identifiers) of the service nodes and/or a sequence of service parameters, and supports dynamic management and search.

In addition, the service chain policy decision point can further perceive a flow identifier of an application-specified service chain and related information (namely, a flow steering rule) of the flow classifier according to a configuration of a service work order or operation and maintenance personnel, and can deliver information such as a service chain policy and a flow steering rule to a corresponding service node and flow classifier in the service chain-enabled domain network by using a southbound interface (such as NetConf/RestConf or RESTful API over HTTP) of the service chain policy decision point.

Figure 2:
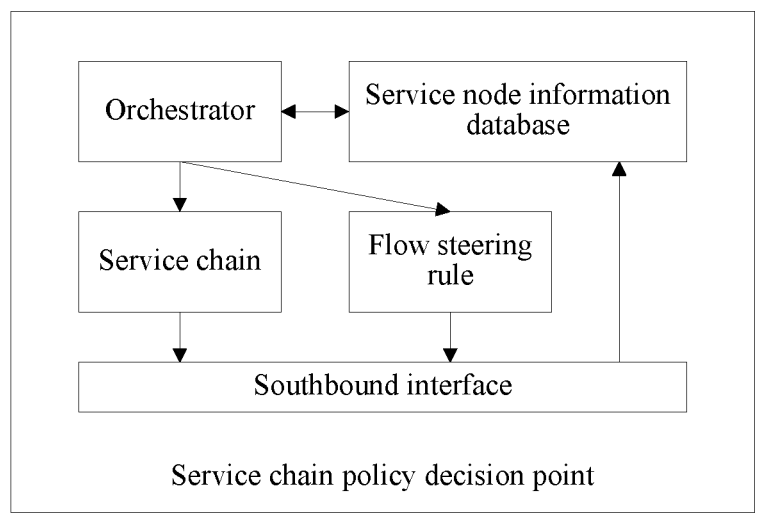
FIG. 2 shows basic functional modules of a service chain policy decision point according to Embodiment 1 of the present invention.

The basic functional modules of the service chain policy decision point, as shown in FIG. 2, include an orchestrator, a service node information database, and a southbound interface. The service node information database is configured to store information of a service node, the orchestrator is configured to orchestrate a service chain and generate a service chain policy and a flow steering rule, and the southbound interface is a communications interface of the service policy decision point. The service chain policy decision point is a logical system, and internal functional modules of the service chain policy decision point may all be deployed on one logical network element, or may be distributed on different network elements. Specific internal interaction manners are not limited in this specification.

The flow classifier (Flow Classifier, FC) is configured to identify a flow, and forward the flow to an ingress SN of a corresponding service chain according to the flow steering rule. The flow classifier may be a device independent of a service node, or may be integrated with a service node.

Figure 3:
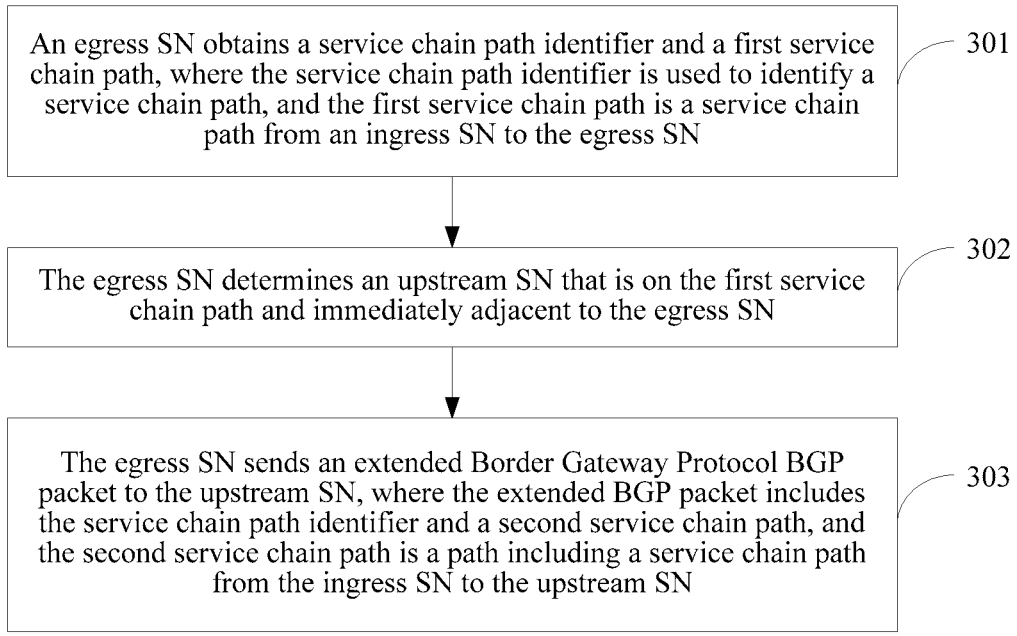
FIG. 3 is a flowchart of a method for implementing a service chain according to Embodiment 1 of the present invention.

As shown in FIG. 3, this embodiment of the present invention provides a method for implementing a service chain. The method is used in a service chain-enabled domain network. A service chain policy decision point, service nodes SNs configured to provide value-added services, and a service chain path that is from an ingress SN to an egress SN and orchestrated by the service chain policy decision point are deployed in the service chain-enabled domain network. The SNs include the ingress SN and the egress SN. The method may include the following steps.

301. The egress SN obtains a service chain path identifier and a first service chain path, where the service chain path identifier is used to identify the service chain path, and the first service chain path is the service chain path from the ingress SN to the egress SN.

In some implementations of the present invention, the service chain policy decision point deploys or delivers a service chain policy (the service chain policy includes at least the service chain path identifier and the service chain path) to the egress SN of the service chain, and specifically may deliver the service chain policy to the egress SN by using a southbound interface of the service chain policy decision point. The egress SN of the service chain may be any SN in the service chain-enabled domain network. The service chain policy decision point may directly send the service chain policy to the egress SN, or may send the service chain policy to the egress SN by using another device. The service chain policy sent to the egress SN may be in various protocol formats, for example, may be in a network layer reachability information (NLRI) format. If the egress SN receives a service chain policy in a non-NLRI format, the egress SN may convert the service chain policy into the NLRI format.

302. The egress SN determines an upstream SN that is on the first service chain path and immediately adjacent to the egress SN.

303. The egress SN sends an extended Border Gateway Protocol BGP packet to the upstream SN, where the extended BGP packet includes the service chain path identifier and a second service chain path, and the second service chain path is a path including a service chain path from the ingress SN to the upstream SN.

The second service chain path may be the service chain path from the ingress SN to the upstream SN, and in this case, it means that the egress SN generates the second service chain path after removing the egress SN from the first service chain path; or the second service chain path may be the service chain path from the ingress SN to the egress SN, and in this case, it means that the second service chain path and the first service chain path are the same.

It should be noted that, in this embodiment of the present invention, "upstream" and "downstream" are based on a service data transmission direction, that is, upstream and downstream in a direction from the ingress SN to the egress SN. The "immediately adjacent" means being immediately adjacent on the service chain path, but does not mean that the egress SN is directly connected to the upstream SN of the egress SN. On the service chain path, an intermediate SN may be included or not included between the ingress SN and the egress SN, and the upstream SN may be the ingress SN, or may be the intermediate SN. Further, an intermediate forwarding device (that is, a BGP peer node used for forwarding between two SN nodes) may be included or not included between two adjacent SN nodes, namely, between the egress SN and the upstream SN. When the intermediate forwarding device is included, that the egress SN sends an extended BGP packet to the upstream SN includes: first, the extended BGP packet is sent to the intermediate forwarding device, and then the intermediate forwarding device sends the extended BGP packet to the upstream SN. For a specific operation manner, refer to Embodiment 4 and Embodiment 5. Details are not further described herein.

Further, optionally, the egress SN obtains a tunnel type, and establishes a tunnel between the upstream SN and the egress SN.

The tunnel type is used to guide the service node in establishing a forwarding tunnel according to the service chain policy. For example, in an application in a DC (Data Center, data center) network, an NVO3 (Network virtualization over Layer 3, network virtualization over layer 3) tunnel may be specified by default, for example, VXLAN (Virtual eXtensible Local Area Network, virtual extensible local area network) or NVGRE (Network Virtualization using Generic Routing Encapsulation, network virtualization using generic routing encapsulation). In an application in an MPLS (Multi Protocol Label Switching, multi protocol label switching) network, an LSP (Label Switch Path, label switched path) may be specified by default. The tunnel type is optional.

When the tunnel type is a label switched path LSP tunnel, the egress SN allocates a label to the service chain path, and adds the label to the extended BGP packet; or when the tunnel type is a network virtualization over layer 3 NVO3 tunnel, the egress SN allocates a local service chain path identifier to the service chain path, generates a tunnel destination identifier according to the local service chain path identifier and an IP address of the egress SN, and adds the tunnel destination identifier to the extended BGP packet.

In some implementations of the present invention, when the tunnel type is an LSP tunnel, the extended BGP packet may specifically carry extended network layer reachability information NLRI, the extended NLRI includes a length field, a label field, and a service chain policy field, the label field carries the label, and the service chain policy field includes a service chain path identifier field carrying the service chain path identifier and a service chain path sequence field carrying the second service chain path. The service chain path identifier is used to indicate the service chain path. The service chain policy decision point allocates or uses a UUID (Universally Unique Identifier, universally unique identifier). The service chain path sequence field indicates a sequence of multiple SNs included on the service chain path, and is used to indicate the service chain path, and may be specifically expressed as a sequence of network layer reachability identifiers (for example, IP addresses and/or VPN instance identifiers) of the service nodes and/or a sequence of service parameters. Further, optionally, the service chain policy field further includes a tunnel type field carrying the LSP tunnel type and/or a service chain policy decision point identifier field carrying the service chain policy decision point identifier. The service chain policy decision point ID is used to indicate a service chain policy decision point, and is optional. When there is only one service chain policy decision point in the service chain-enabled domain network, the service chain policy may not include the service chain policy decision point ID.

Referring to the foregoing description, when the tunnel type is an NVO3 tunnel, the extended BGP packet may specifically carry extended network layer reachability information NLRI, the extended NLRI includes a length field, a tunnel destination identifier field, and a service chain policy field, the tunnel destination identifier field includes at least a local service chain identifier field carrying the local service chain path identifier and a destination IP address field carrying an IP address of the downstream SN, and the service chain policy field includes a service chain path identifier field carrying the service chain path identifier and a service chain path sequence field carrying the second service chain path. Further, optionally, the service chain policy field further includes a tunnel type field carrying the NVO3 tunnel type and/or a service chain policy decision point identifier field carrying the service chain policy decision point identifier.

As can be seen from above, this embodiment of the present invention discloses a method for implementing a service chain. In this method, an egress SN obtains a service chain path identifier and a first service chain path, where the service chain path identifier is used to identify the service chain path, and the first service chain path is a service chain path from the ingress SN to the egress SN; the egress SN determines an upstream SN that is on the first service chain path and immediately adjacent to the egress SN; and the egress SN sends an extended Border Gateway Protocol BGP packet to the upstream SN, where the extended BGP packet includes the service chain path identifier and a second service chain path, and the second service chain path is a path including a service chain path from the ingress SN to the upstream SN. The following technical effects are achieved:

1. A service chain policy decision point only needs to deliver a service chain policy including the service chain path identifier and the service chain path to the egress SN on the service chain path, and the service chain policy may be disseminated from the egress to the ingress SN of the service chain in a reverse direction (the reverse direction is a direction from the egress SN to the ingress SN), and a chain path of the service chain is automatically established. Therefore, automatic service chain deployment is implemented, and service chain deployment difficulty is reduced.

2. In this embodiment of the present invention, each tunnel of the service chain is established from the egress SN to the ingress SN sequentially. After the ingress SN establishes a tunnel with a downstream SN of the ingress SN, it means that a chain path of the whole service chain is established successfully. In this case, when a flow is steered in, the flow is not lost.

3. The service chain policy decision point only needs to interact with the egress SN, without delivering the service chain policy to each SN separately, monitoring a route reachability status of each service node, or performing multipoint control and coordination. This reduces objects that interact with the service chain policy decision point, and therefore reduces computation and processing load of the service chain policy decision point. Therefore, operation, administration and maintenance are simpler, and extensibility is higher. In addition, load of a control and management channel between the service chain policy decision point and the service node is reduced.

In addition, in the technical solution of the present invention, there are few network upgrades, and deployment is easy.

Embodiment 2

Figure 4:
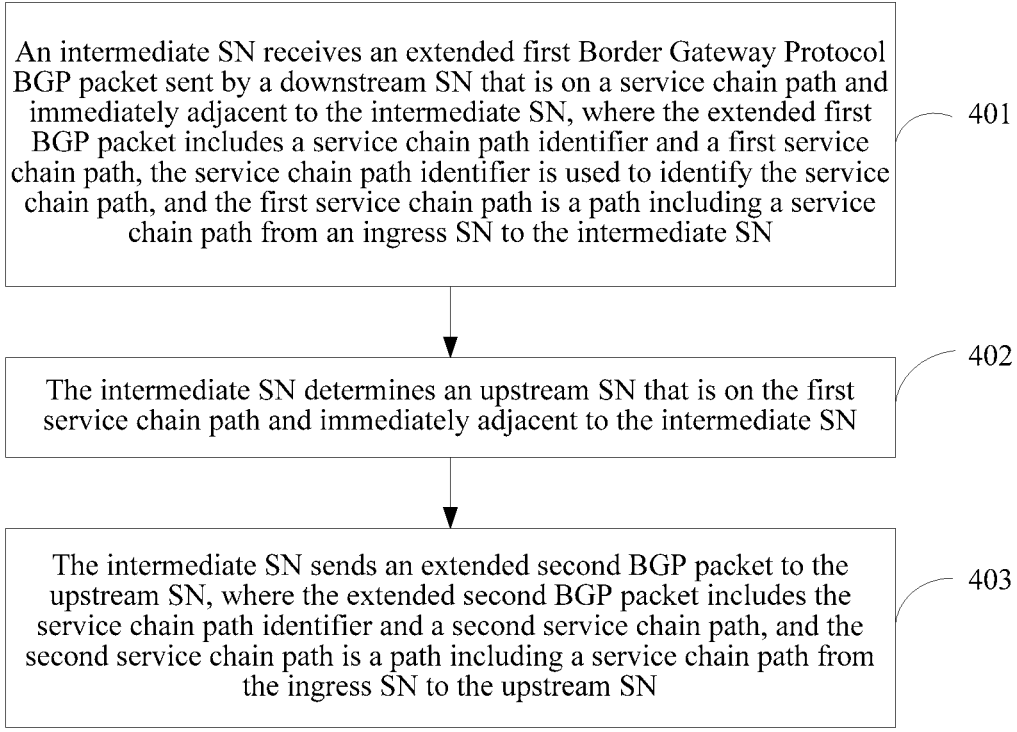
FIG. 4 is a flowchart of a method for implementing a service chain according to Embodiment 2 of the present invention.

As shown in FIG. 4, this embodiment of the present invention provides another method for implementing a service chain. The method is used in a service chain-enabled domain network. A service chain policy decision point, service nodes SNs configured to provide value-added services, and a service chain path that is from an ingress SN to an egress SN through an intermediate SN and orchestrated by the service chain policy decision point are deployed in the service chain-enabled domain network. The SNs include the ingress SN, the intermediate SN, and the egress SN. The method includes the following steps.

401. The intermediate SN receives an extended first Border Gateway Protocol BGP packet sent by a downstream SN that is on the service chain path and immediately adjacent to the intermediate SN, where the extended first BGP packet includes the service chain path identifier and the first service chain path, the service chain path identifier is used to identify the service chain path, and the first service chain path is a path including a service chain path from the ingress SN to the intermediate SN.

402. The intermediate SN determines an upstream SN that is on the first service chain path and immediately adjacent to the intermediate SN.

403. The intermediate SN sends an extended second BGP packet to the upstream SN, where the extended second BGP packet includes the service chain path identifier and a second service chain path, and the second service chain path is a path including a service chain path from the ingress SN to the upstream SN.

The first service chain path may be the service chain path from the ingress SN to the intermediate SN; correspondingly, the second service chain path may be the service chain path from the ingress SN to the upstream SN. This means that in a process of transferring the service chain path from the egress SN to the ingress SN, an SN is removed from the service chain path every time an SN is passed through. Therefore, the service chain path that is transferred is gradually shortened and changed.

Alternatively, the first service chain path may be the service chain path from the ingress SN to the egress SN; correspondingly, the second service chain path may be the service chain path from the ingress SN to the egress SN. This means that in a process of transferring the service chain path from the egress SN to the ingress SN, the service chain path is not shortened. The complete service chain path is always transferred.

It should be noted that, on the service chain path, an intermediate forwarding device (that is, another BGP peer node used for forwarding between two SN nodes) may be included or not included between two adjacent SN nodes, namely, between the intermediate SN and the upstream SN. When the intermediate forwarding device is included, that the intermediate SN sends an extended second BGP packet to the upstream SN includes: first, the extended second BGP packet is sent to the intermediate forwarding device, and then the intermediate forwarding device sends the extended second BGP packet to the upstream SN. For a specific operation manner, refer to Embodiment 4 and Embodiment 5. Details are not further described herein.

It should be noted that, any intermediate SN before the egress SN may receive an extended BGP packet sent by a downstream SN of the intermediate SN. In addition, the intermediate SN may continue to send the extended BGP packet to an upstream SN of the intermediate SN. The downstream SN is a next SN immediately adjacent to the intermediate SN on the service chain path, and the upstream SN is a previous SN immediately adjacent to the intermediate SN on the service chain path.

Further, optionally, after the intermediate SN receives the extended first BGP packet sent by the downstream SN that is on the service chain path and immediately adjacent to the intermediate SN, the method further includes: the intermediate SN establishes a first tunnel from the intermediate SN to the downstream SN with the downstream SN, and links the first tunnel to a second tunnel to form one tunnel according to the service chain path identifier, where the second tunnel is a tunnel that is from the upstream SN to the intermediate SN and established by the upstream SN with the intermediate SN.

The extended first BGP packet further includes a tunnel type, the tunnel type may include at least a label switched path LSP tunnel and a network virtualization over layer 3 NVO3 tunnel. Specific processing manners are as follows:

Manner 1: When the tunnel type is an LSP tunnel, the intermediate SN obtains a first label from the extended first BGP packet, where the first label is a label allocated by the downstream SN to the service chain path identifier, and the intermediate SN establishes the first tunnel with the downstream SN, where the first tunnel is an LSP tunnel from the intermediate SN to the downstream SN;

the intermediate SN allocates a second label to the service chain path identifier, and adds the second label to the extended second BGP packet, where the second label is used by the upstream SN to establish the second tunnel with the intermediate SN, and the second tunnel is an LSP tunnel from the upstream SN to the intermediate SN; and the intermediate SN associates the second label with the first label according to the service chain path identifier, and generates a label forwarding table, where the second label is used as an incoming label, and the first label is used as an outgoing label, so that the first tunnel is linked to the second tunnel to form one tunnel.

Manner 2: When the tunnel type is an NVO3 tunnel, the intermediate SN obtains a first tunnel destination identifier from the extended first BGP packet, where the first tunnel destination identifier includes an IP address of the downstream SN and a first local service chain path identifier allocated by the downstream SN to the service chain path, and the intermediate SN establishes the first tunnel with the downstream SN, where the first tunnel is an NVO3 tunnel from the intermediate SN to the downstream SN;

the intermediate SN allocates a second local service chain path identifier to the service chain path, generates a second tunnel destination identifier according to the second local service chain path identifier, and adds the second tunnel destination identifier to the extended second BGP packet, where the second tunnel destination identifier includes an IP address of the intermediate SN and the second local service chain path identifier, the second tunnel destination identifier is used by the upstream SN to establish the second tunnel with the intermediate SN, and the second tunnel is an NVO3 tunnel from the upstream SN to the intermediate SN; and the intermediate SN associates the second tunnel destination identifier with the first tunnel destination identifier according to the service chain path identifier, and generates a forwarding information table, so that the first tunnel is linked to the second tunnel to form one tunnel.

Further, optionally, the NVO3 tunnel is specifically a virtual extensible local area network VXLAN tunnel or a network virtualization using generic routing encapsulation NVGRE tunnel, and the method further includes:

the intermediate SN receives a service data packet of the service chain that is sent by the upstream SN, terminates a tunnel encapsulation header of the second tunnel in the service data packet, and reencapsulates a tunnel encapsulation header of the first tunnel, where a specific field of the tunnel encapsulation header of the first tunnel is filled with the first local service chain path identifier, where when the tunnel type is a VXLAN tunnel, the filled specific field is a VXLAN network identifier VNI field of a VXLAN header; or when the tunnel type is an NVGRE tunnel, the filled specific field is a virtual subnet identifier VSI field of an NVGRE header.

In some implementations of the present invention, when the tunnel type is an LSP tunnel, specific formats of the extended first BGP packet and the extended second BGP packet are consistent with the format of the extended BGP packet described in Embodiment 1. Details are not further described herein again. A difference from Embodiment 1 lies in that a value carried by each field is different. Using the first BGP packet as an example, specifically, when the tunnel type is an LSP tunnel, a label field carries the first label, and a service chain path sequence field carries the first service chain path; when the tunnel type is an NVO3 tunnel, the extended BGP packet may be specifically: a local service chain identifier field carries the first local service chain path identifier, a destination IP address field carries the IP address of the downstream SN, and a service chain path sequence field carries the first service chain path.

This embodiment of the present invention discloses a method for implementing a service chain above. Terms, definitions, and descriptions used in this method keep consistent with those in Embodiment 1. Details are not further described herein again.

In the method of this embodiment, after an intermediate SN of a service chain receives an extended first BGP packet sent by a downstream SN that is on the service chain path and immediately adjacent to the intermediate SN, the intermediate SN establishes a tunnel with the downstream SN and an upstream SN respectively, and links the two tunnels without obtaining an instruction that is used for establishing a tunnel and delivered by a service chain policy decision point. Therefore, this reduces interactions between the service chain policy decision point and the intermediate SN, and reduces computation and processing load of the service chain policy decision point. Therefore, operation, administration and maintenance are simpler, and extensibility is higher. In addition, this helps implement automatic service chain deployment, and helps reduce service chain deployment difficulty.

Embodiment 3

Based on the technical solutions of Embodiments 1 and 2, this embodiment further provides a method for implementing a service chain. The method of this embodiment is performed by an ingress SN of a service chain.

The method of this embodiment is used in a service chain-enabled domain network. A service chain policy decision point, service nodes SNs configured to provide value-added services, and a service chain path that is from an ingress SN to an egress SN and orchestrated by the service chain policy decision point are deployed in the service chain-enabled domain network. The SNs include the ingress SN and the egress SN.

Figure 5:
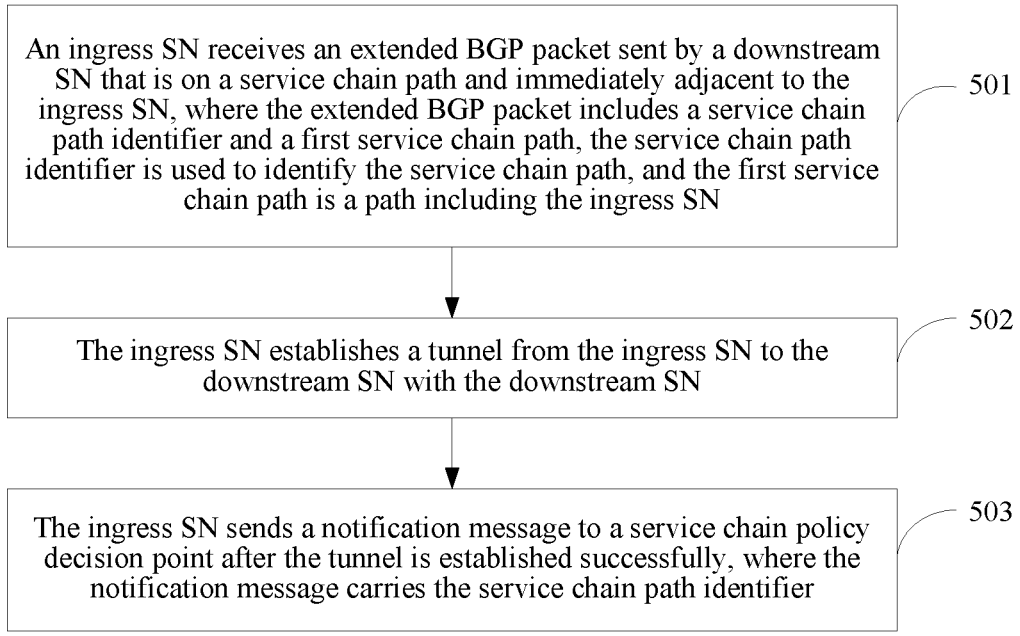
FIG. 5 is a flowchart of a method for implementing a service chain according to Embodiment 3 of the present invention.

Referring to FIG. 5, the method of this embodiment may include the following steps.

501. The ingress SN receives an extended BGP packet sent by a downstream SN that is on the service chain path and immediately adjacent to the ingress SN, where the extended BGP packet includes a service chain path identifier and a first service chain path, the service chain path identifier is used to identify the service chain path, and the first service chain path is a path including the ingress SN.

The first service chain path may be the ingress SN; this means that in a process of transferring the service chain path from the egress SN to the ingress SN, an SN is removed from the service chain path every time an SN is passed through, and when the service chain path arrives at the ingress SN, only the ingress SN remains on the service chain path. Alternatively, the first service chain path may be the service chain path from the ingress SN to the egress SN; this means that in a process of transferring the service chain path from the egress SN to the ingress SN, the service chain path is not shortened, and the complete service chain path is always transferred.

502. The ingress SN establishes a tunnel from the ingress SN to the downstream SN with the downstream SN.

503. The ingress SN sends a notification message to a service chain policy decision point after the tunnel is established successfully, where the notification message carries the service chain path identifier.

Optionally, specifically, the ingress SN (namely, a first SN in a service chain path sequence) may send, to the corresponding service chain policy decision point, a notification message indicating that a forwarding path of the service chain (namely, a service chain path) is established successfully, where the notification message may carry a service chain ID, and may further carry a service chain forwarding path status (for example, established successfully). A specific bearing message may be a notify message of NetConf/RestConf or a query response message of a web APP. The service chain policy decision point learns, by receiving the notification message sent by the ingress SN, that the service chain forwarding path is established successfully.

In this embodiment of the present invention, the service chain-enabled domain network further includes a flow classifier (for example, the flow classifier in FIG. 1). The flow classifier may be deployed in two manners. It may be an independent device, or may be a same device as the ingress SN (that is, the flow classifier is integrated with the ingress device). The following separately describes processing methods in the two deployment manners.

Manner 1: When the flow classifier is an independent device, the method may further include:

the ingress SN receives flow entry information sent by the service chain policy decision point, where the flow entry information includes information about the flow classifier; and the ingress SN disseminates the extended BGP packet to the flow classifier, where the extended BGP packet is used by the flow classifier to establish a pull-in tunnel from the flow classifier to the ingress SN with the ingress SN.

Optionally, specifically, after receiving the disseminated service chain policy, the flow classifier initiates a tunnel establishment procedure, and establishes a pull-in tunnel of a specified tunnel type with the corresponding ingress SN. In addition, the ingress SN may establish a mapping relationship between the pull-in tunnel and the service chain path identifier to establish a forwarding path from the flow classifier to the service chain. Specifically, a one-to-one mapping relationship may be established between an identifier of the pull-in tunnel and <service chain policy decision point identifier, service chain path identifier>.

Further, optionally, after receiving the notification message and learning that the service chain forwarding path is established successfully, the service chain policy decision point may establish an association relationship between a flow steering rule of the applied service chain and the service chain ID, and then may deliver an association message to the flow classifier by using a southbound interface of the service chain policy decision point, so that the flow classifier steers a flow of the service chain to the forwarding path of the service chain. The association message may carry information such as a flow identifier, the service chain path identifier, an identifier of the ingress SN of the service chain path, the tunnel type, and a bound interface list on which a flow rule application of the flow classifier is effective. The flow identifier may include a group of packet field filter rules, and a specific form may be an ACL (Access Control List, access control list). The information about the bound interface list on which the flow rule application is effective may include an interface identifier and a direction in which an interface flow application is effective (for example, an incoming direction, an outgoing direction, or both directions). The flow classifier may steer the flow of the service chain to the forwarding path of the service chain according to the flow steering rule by using the pull-in tunnel. As the flow classifier steers the flow matched and hit by the flow identifier from the established pull-in tunnel to the tunnel corresponding to the corresponding service chain forwarding path, SNs on the whole tunnel forwarding path can forward a service flow packet according to tunnel information. After the egress SN (namely, a last SN in the service chain path sequence) of the service chain path terminates tunnel encapsulation in the service flow packet, the egress SN may forward the service flow packet in a conventional L2/L3 (layer 2/layer 3) routing manner again.

Manner 2: When the flow classifier is integrated with the ingress SN, the method may further include:

the ingress SN receives an association message delivered by the service chain policy decision point, where the association message includes an association relationship between the service chain path identifier and a flow steering rule; and the ingress SN steers a flow of the service chain to the service chain path according to the association relationship.

For detailed descriptions about sending and processing of association information, refer to the manner 1 in this embodiment. Details are not further described herein again.

In some embodiments of the present invention, the method further includes:

the ingress SN receives a service data packet of the service chain, and performs tunnel encapsulation on the service data packet before sending the service data packet to the downstream SN.

In some implementations of the present invention, when the tunnel type is an LSP tunnel, a specific format of the extended BGP packet is consistent with the format of the extended BGP packet described in Embodiment 1. Details are not further described herein again. A difference from Embodiment 1 lies in that a value carried by each field is different. Specifically, when the tunnel type is an LSP tunnel, a label field carries the label, and a service chain path sequence field carries the first service chain path; when the tunnel type is an NVO3 tunnel, the extended BGP packet may be specifically: a local service chain identifier field carries the local service chain path identifier, a destination IP address field carries an IP address of the downstream SN, and a service chain path sequence field carries the first service chain path.

This embodiment of the present invention discloses a method for implementing a service chain above. Terms, definitions, and descriptions used in this method keep consistent with those in Embodiments 1 and 2. Details are not further described herein again.

As can be seen from above, this embodiment of the present invention discloses a method for implementing a service chain. After an ingress SN of a service chain path obtains an extended BGP packet sent by a downstream SN, the ingress SN establishes a tunnel with the downstream SN without obtaining an instruction that is used for establishing a tunnel and delivered by a service chain policy decision point. Therefore, this reduces interactions between the service chain policy decision point and the ingress SN, and reduces computation and processing load of the service chain policy decision point. Therefore, operation, administration and maintenance are simpler, and extensibility is higher. In addition, this helps implement automatic service chain deployment, and helps reduce service chain deployment difficulty.

Embodiment 4

Figure 6:
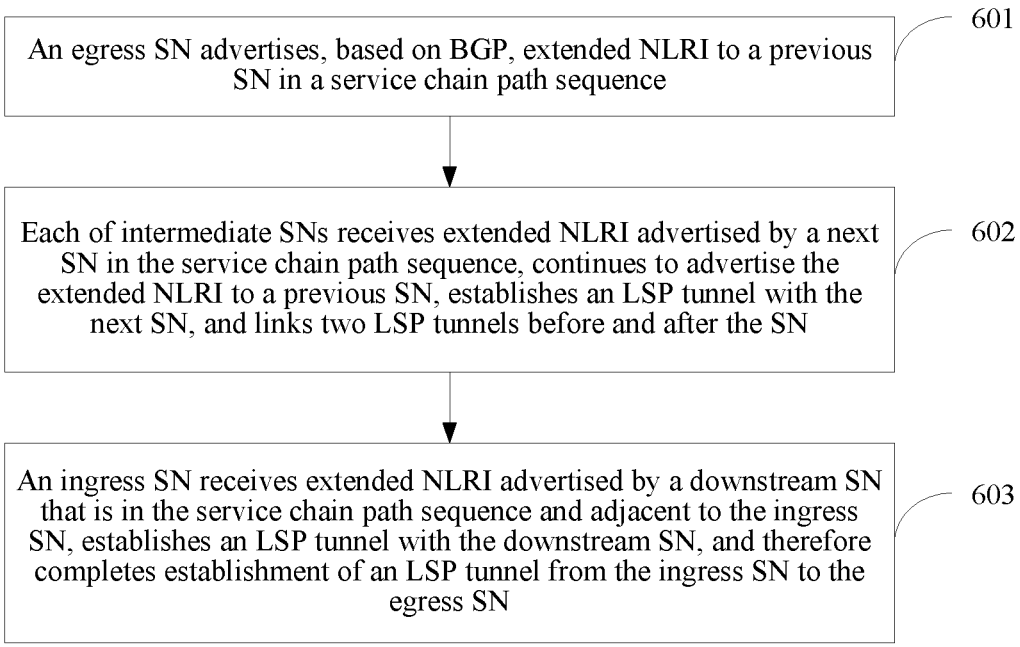
FIG. 6 is a flowchart of a procedure for establishing a tunnel and forwarding a service flow packet according to Embodiment 4 of the present invention.

This embodiment is a more specific implementation based on the technical solutions of Embodiments 1, 2, and 3. In this embodiment, a tunnel type of a service chain is an LSP (label switched path). Referring to FIG. 6, in this embodiment, a procedure for establishing a tunnel and forwarding a service flow packet is described as follows:

601. An egress SN advertises, based on BGP, extended NLRI to a previous SN in a service chain path sequence.

In this embodiment, the extended NLRI is newly defined NLRI, and is used to indicate a service chain policy. A basic format of the extended NLRI may be <length (length), Label(s) (label), Service Chain Policy (service chain policy)>. A basic format of Service Chain Policy may be <Controller ID, Service Chain ID, Tunnel Type, SN Number, SN Sequence>, where Controller ID is a service chain policy decision point identifier (optional), Service Chain ID is a service chain path identifier (mandatory), Tunnel Type is a tunnel type (optional), SN Number is a quantity of SNs (optional), and SN Sequence is the service chain path sequence (mandatory). A basic format of SN node information in SN Sequence is <RD (optional, optional), IP Address, Metadata length (optional), Metadata value (optional)>. RD is an acronym of route distinguisher, and is a flag indicating to which VPN a route belongs; IP Address is an IP address of an SN; Metadata length is a metadata length (optional); Metadata value is a metadata value (optional). Alternatively, SN Number and SN Sequence may be separately defined as new extended path attributes. The extended NLRI may be used in MP_REACH_NLRI/MP_UNREACH_NLRI (two path attributes defined in RFC 2858). In addition, Metadata indicates metadata that the current SN needs to transfer to a next SN in the service chain path sequence. Specific content of Metadata may be related to a flow or unrelated to a flow. Metadata value defines a group of metadata definition and value setting rules, and is used to guide a forwarding plane of the current SN in filling metadata and adding the metadata to a packet, and guide the next SN in obtaining and parsing the metadate from the packet. The metadata may be carried optionally. Directly filling with a specific numeric value is only a special case. Specific use is not limited in this specification.

It should be noted that, a mandatory field is a field that needs to be carried in the extended NLRI or a field that needs to be carried and needs to be filled with a valid value; an optional field is a field that may be carried in the extended NLRI selectively or a field that needs to be carried but may be filled with an invalid value.

Code of the extended NLRI (AFI=1 or 2, SAFI=TBD, a to-be-allocated code value) may be as follows:

```
+--------------------------+
| Length (1 or 2 octets)   |
+--------------------------+
| Tunnel Info (variable)   |
+--------------------------+
| SFC Policy (variable)    |
+--------------------------+
```

A reference code format of Tunnel Information (Tunnel Info) is a compact TLV format as follows:

```
+--------------------------+
| Type (1 octet)           |
+--------------------------+
| Length (1 octet)         |
+--------------------------+
| Value (variable)         |
+--------------------------+
Type 1: indicates an LSP tunnel.
+--------------------------+
| 1 (1 octet)              |
+--------------------------+
| 3 (1 octet)              |
+--------------------------+
| Label ID (3 octets)      |
+--------------------------+
Type 2: indicates a VXLAN tunnel.
+--------------------------+
| 2 (1 octet)              |
+--------------------------+
| 15 or 27 (1 octet)       |
+--------------------------+
| RD (8 octets)            | (It is optional, and an invalid value is 0)
+--------------------------+
| SN IP (4 or 16 octets)   |
+--------------------------+
| Local SFC ID (3 octets)  |
+--------------------------+
```

A reference code format of SFC Policy is as follows:

```
+--------------------------+
| Controller ID (8 octets) |
+--------------------------+
| SFC ID (8 octets)        |
+--------------------------+
| Tunnel Type (1 octet)    |
+--------------------------+
| SN Number (1 octet)      |
+--------------------------+
| SN 1 Info (variable)     |
+--------------------------+
   ...
+--------------------------+
| SN n Info (variable)     |
+--------------------------+
```

A reference code format of SN Information (SN Info) is as follows:

```
+--------------------------+
| RD (8 octets)            |
+--------------------------+
| SN IP (4 or 16 octets)   |
+--------------------------+
| Metadata length (1 octet)|
+--------------------------+
| Metadata (variable)      |
+--------------------------+
```

Metadata may include a group of defined TLVs that are more refined. A specific format is not limited in the present invention. If Metadata length is 0, it means that the SN Information does not carry metadata.

It should be noted that, in this specification, service chain is an abbreviation of service function chain, and SFC is an acronym of service function chain (service chain), that is, SFC may also be understood as an acronym of service chain. In conclusion, the service chain, service function chain, and SFC in this specification have the same meaning, and are all used to represent a service chain.

In this embodiment of the present invention, BGP supports the extended NLRI and becomes extended BGP. A new SAFI (Subsequent Address Family Identifier, subsequent address family identifier) may be defined in the extended BGP. However, an AFI (Address Family Identifier, subsequent address family identifier) remains unchanged according to the existing standard (for example, an AFI of an IPv4 network is 1, an AFI of an IPv6 network is 2, and an AFI of an L2VPN is 25).

Tunnel establishment is a procedure on a signaling plane. The extended NLRI is advertised forward based on BGP in a reverse service chain path sequence. Metadata transferred on the signaling plane guides the current SN in filling an original packet with inserted metadata when the current SN processes a service data packet in the service chain, so that the next SN performs corresponding processing according to the metadata that is inserted in the packet by the current SN, for example, a basic forwarding module of the SN selects a specific value-added service module or a value-added service module of the SN extracts a service parameter.

602. Each of intermediate SNs receives extended NLRI advertised by a next SN in the service chain path sequence, continues to advertise the extended NLRI to a previous SN, establishes an LSP tunnel with the next SN, and links two LSP tunnels before and after the SN.

After the SN receives a service chain advertisement (namely, the extended NLRI advertised by the next SN), first, the SN saves service chain policy information indicated by the extended NLRI.

Secondly, if SNs decrease on a service chain path on a per-hop basis (that is, in a process of transferring the service chain path from the egress SN to an ingress SN, an SN is removed from the service chain path every time an SN is passed through), an SN extracts an identifier of the SN from an end of the service chain path sequence, obtains an identifier of a previous SN in the service chain path sequence, and removes the identifier of the SN from the service chain path. At the same time, 1 is subtracted from a value of SN Number correspondingly. If a manner of a complete service chain path is used (that is, in a process of transfer from the egress SN to the ingress SN, the complete service chain path is always carried and is not shortened), an SN needs to determine a position of the SN on the service chain path according to an identifier of the SN, and obtain an identifier of a previous SN in the service chain path sequence.

Then, the SN searches for a route according to the identifier of the previous SN in the service chain path sequence, and advertises modified extended NLRI to only a source BGP peer (peer) of the route, where the extended NLRI carries a label allocated by the SN to the service chain. The label (Label ID) is a label allocated by the SN locally, and is mapped to <Controller ID, Service Chain ID> on a one-to-one basis, or is mapped to <Service Chain ID> on a one-to-one basis.

When an intermediate forwarding device further exists between two adjacent SNs on the service chain path, the intermediate forwarding device determines, by using the following method, that the intermediate forwarding device is not a destination SN:

If SNs decrease on the service chain path on a per-hop basis, the intermediate forwarding device extracts an identifier of the destination SN from the end of the service chain path sequence, compares an identifier of the intermediate forwarding device with the identifier of the destination SN, and determines that the intermediate forwarding device is not the destination SN.

If the manner of the complete service chain path is used, the intermediate forwarding device first needs to obtain the destination SN. There are multiple manners. In an example 1, the current destination SN in the service chain path sequence needs to be obtained according to SN Number. For example, if five SN nodes, namely, an SN1, an SN2, an SN3, an SN4, and an SN5, sequentially exist in the service chain path sequence, but SN Number is equal to 3, the SN3 is the current destination SN. In an example 2, a field of the destination SN is added to the NLRI to identify the current destination SN. Then the intermediate forwarding device compares the identifier of the intermediate forwarding device with the identifier of the destination SN, and determines that the intermediate forwarding device is not the destination SN.

After the intermediate forwarding device determines that the intermediate forwarding device is not the destination SN, the intermediate forwarding device does not modify <SN Number, SN Sequence>, but only reallocates a label, searches for a BGP route according to the identifier of the destination SN, continues to advertise the extended NLRI to an upstream BGP peer (PEER) identified by a next hop of the found BGP route on the service chain, and generates a label forwarding table locally. If other forwarding devices such as routers exist between a group of BGP peers, a forwarding path of an underlying (underlay) network may be established depending on a conventional routing and tunneling manner such as conventional IGP (Interior Gateway Protocol, Interior Gateway Protocol)/LDP (Label Distribution Protocol, Label Distribution Protocol). The forwarding path is transparent to a service chain forwarding path.

In this way, an LSP crossing non-SNs may be formed between SNs, and multiple such LSPs are seamlessly linked to form an LSP of a whole service chain. In addition, different service chains may exclusively use an LSP. For example, "SN1 to SN2" are orchestrated into two service chains, and two LSPs are actually respectively established between the SN1 and the SN2 for the two service chains. The SN may associate two adjacent LSPs by using <Controller ID, Service Chain ID>, to implement seamless interconnection.

Using an $i^{th}$ SN in the service chain path sequence as an example, where i is an integer that is greater than 1 but less than M, and M is a quantity of SNs included in the service chain path sequence:

the $i^{th}$ SN receives extended NLRI advertised by an $(i+1)^{th}$ SN, where a last SN in the service chain path sequence in the received extended NLRI is the $(i+1)^{th}$ SN, and the received extended NLRI includes a first label allocated to the service chain path identifier by a previous-hop SN or an intermediate forwarding device that advertises the extended NLRI;

the $i^{th}$ SN modifies the received extended NLRI, removes information of the $i^{th}$ SN in the service chain path sequence and the first label from the received extended NLRI, allocates a second label to the service chain path identifier, and fills the modified extended NLRI with the second label; and the $i^{th}$ SN searches for a BGP route according to an identifier of an $(i-1)^{th}$ SN in the service chain path sequence, and advertises the modified extended NLRI to a BGP peer peer identified by a next hop of the found BGP route, so that the modified extended NLRI is advertised to the $(i-1)^{th}$ SN. The extended NLRI may be directly transferred to the $(i-1)^{th}$ SN, or may be transferred to the $(i-1)^{th}$ SN indirectly through another intermediate forwarding device. If the extended NLRI received by the $i^{th}$ SN is transferred by the $(i+1)^{th}$ SN indirectly through an intermediate forwarding device, the $i^{th}$ SN and the $(i+1)^{th}$ SN may establish an LSP crossing the intermediate forwarding device.

The intermediate forwarding device is a non-SN BGP peer node that is used for forwarding a service chain data packet only, and may be a router supporting extended BGP. After the router receives the extended NLRI, the router finds that the router is not the last SN in the service chain path sequence (that is, the router is an intermediate forwarding device to arrive at the SN), continues to search for a route according to identifier information of the SN, advertises the extended NLRI to a next-hop router, and assists in establishing a tunnel. In addition to normally advertising a route, the intermediate device between two SNs needs to allocate a label to the service chain, and extended NLRI advertised to an upstream SN should carry the allocated label.

603. An ingress SN receives extended NLRI advertised by a downstream SN that is in the service chain path sequence and adjacent to the ingress SN, establishes an LSP tunnel with the downstream SN, and therefore completes establishment of an LSP tunnel from the ingress SN to the egress SN.

Further, optionally, in some embodiments, when a flow classifier is an independent device, the method further includes: establishing a pull-in tunnel between the flow classifier and the ingress SN of the service chain path. The flow classifier may be a provider network edge PE (Provider Edge, provider edge) device. In this case, when associating a flow steering rule with the service chain, a service chain policy decision point may synchronously deliver a piece of flow entry information to the ingress SN of the service chain, to guide the ingress SN in disseminating service chain information carried in the extended NLRI to the flow classifier (in this case, SN Number in the extended NLRI is 0, and no SN Sequence information exists), so as to trigger the flow classifier to establish an LSP with the ingress SN (namely, the pull-in tunnel described above). The flow entry information should include a network layer reachability identifier of the flow classifier and the service chain ID. A specific message bearing manner may be NetConf/RestConf or RESTful API over HTTP.

The flow classifier steers a corresponding flow to the ingress SN of the corresponding service chain path. Therefore, a whole path, from the flow classifier to the ingress SN of the service chain to the egress SN of the service chain, is formed by multiple seamlessly linked LSPs, and the packet is forwarded with labels in the whole process.

In this embodiment, establishment of a service chain tunnel is described in detail above by using an example in which the tunnel type of the service chain is an LSP.

Embodiment 5

Figure 7:
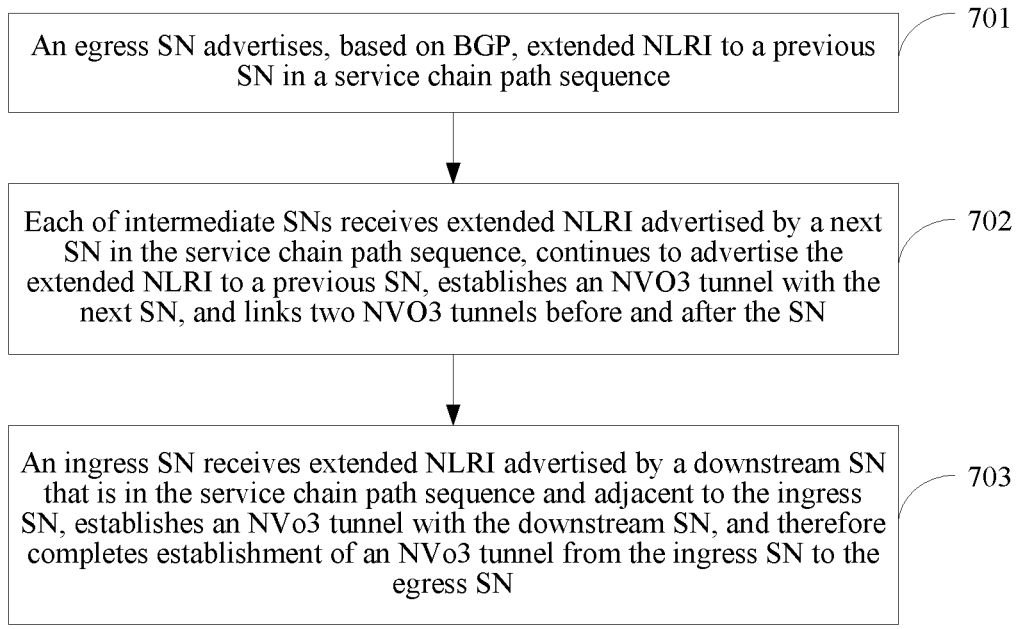
FIG. 7 is a flowchart of a procedure for establishing a tunnel and forwarding a service flow packet according to Embodiment 5 of the present invention.

This embodiment is a more specific implementation based on the technical solutions of Embodiments 1, 2, and 3. In this embodiment, a tunnel type of a service chain is an NVO3 tunnel. The NVO3 tunnel is a tunnel based on IP (Internet Protocol, Internet Protocol) or UDP (User Datagram Protocol, User Datagram Protocol), and may be specifically a VXLAN (virtual extensible local area network) or NVGRE (network virtualization using generic routing encapsulation) tunnel. Referring to FIG. 7, in this embodiment, a procedure for establishing a tunnel (using VXLAN as an example) and forwarding a service flow packet is described as follows:

701. An egress SN advertises, based on BGP, extended NLRI to a previous SN in a service chain path sequence.

In this embodiment, the extended NLRI is newly defined NLRI, and is used to indicate a service chain policy. A basic format of the extended NLRI may be <length, Tunnel Destination (tunnel description), Service Chain Policy>. A basic format of Tunnel Destination may be <RD (optional), IP Address, Local Service Chain ID>. RD is an acronym of route distinguisher, and is a flag indicating to which VPN a route belongs; IP Address is an IP address of a previous-hop SN of a current SN; Local Service Chain ID (local service chain path identifier) is an identifier allocated by the SN locally, and is mapped to <Service Chain ID> or <Controller ID, Service Chain ID> on a one-to-one basis. A specific form may also be expressed by a label. Controller ID is a service chain policy decision point identifier (optional), and Service Chain ID is a service chain path identifier (mandatory). Other definitions and descriptions are the same as those in Embodiment 4. Details are not further described herein again.

702. Each of intermediate SNs receives extended NLRI advertised by a next SN in the service chain path sequence, continues to advertise the extended NLRI to a previous SN, establishes an NVO3 tunnel with the next SN, and links two NVO3 tunnels before and after the SN.

After the SN receives a service chain advertisement (namely, the extended NLRI advertised by the next SN), first, the SN saves the extended NLRI.

Secondly, if SNs decrease on a service chain path on a per-hop basis (that is, in a process of transferring the service chain path from the egress SN to an ingress SN, an SN is removed from the service chain path every time an SN is passed through), an SN extracts an identifier of the SN from an end of the service chain path sequence, obtains an identifier of a previous SN in the service chain path sequence, and removes the identifier of the SN from the service chain path, and at the same time, 1 is subtracted from a value of SN Number correspondingly. If a manner of a complete service chain path is used (that is, in a process of transfer from the egress SN to the ingress SN, the complete service chain path is always carried and is not shortened), an SN needs to determine a position of the SN on the service chain path according to an identifier of the SN, and obtain an identifier of a previous SN in the service chain path sequence.

Then, the SN searches for a route according to a network layer reachability identifier (<RD (optional), IP Address>) of the tunnel destination in the extended NLRI, and checks whether the route is reachable. If the route is reachable, the SN extracts information of the SN from the service chain path sequence, and establishes, by using the network layer reachability identifier as a source, a VXLAN tunnel with a destination SN identified by the tunnel destination, where a VXLAN ID is filled with the local service chain ID of the tunnel destination. In addition, the SN fills a new tunnel destination with the network layer reachability identifier of the SN and the local service chain ID allocated to the service chain, and generates a forwarding table according to the allocated local service chain ID, where an outbound interface corresponds to the previously established tunnel. In addition, the SN searches for a route according to the identifier of the previous SN, and advertises modified service chain information to only a source BGP peer node of the route. If the route is unreachable, the SN returns a nodify (notify) message to a BGP peer node that advertises the service chain information, where the notify message carries an error type and an error code, notifying the BGP peer node that the tunnel destination is unreachable.

When another intermediate forwarding device further exists between two adjacent SNs on the service chain path, the intermediate forwarding device determines, by using the following method, that the intermediate forwarding device is not a destination SN:

If SNs decrease on the service chain path on a per-hop basis, the intermediate forwarding device extracts an identifier of the destination SN from the end of the service chain path sequence, compares an identifier of the intermediate forwarding device with the identifier of the destination SN, and determines that the intermediate forwarding device is not the destination SN.

If the manner of the complete service chain path is used, the intermediate forwarding device first needs to obtain the destination SN. There are multiple manners. In an example 1, the current destination SN in the service chain path sequence needs to be obtained according to SN Number. For example, if five SN nodes, namely, an SN1, an SN2, an SN3, an SN4, and an SN5, sequentially exist in the service chain path sequence, but SN Number is equal to 3, the SN3 is the current destination SN. In an example 2, a field of the destination SN is added to the NLRI to identify the current destination SN. Then the intermediate forwarding device compares the identifier of the intermediate forwarding device with the identifier of the destination SN, and determines that the intermediate forwarding device is not the destination SN.

After the intermediate forwarding device determines that the intermediate forwarding device is not the destination SN, the intermediate forwarding device does not modify the current extended NLRI, but only searches for a BGP route according to the identifier of the destination SN, and continues to advertise the service chain information to a BGP peer (PEER) identified by a next hop of the found BGP route. If another router exists between a group of BGP peers, a forwarding path of an underlying network is established depending on a conventional routing and tunneling manner such as conventional IGP. The forwarding path is transparent to a service chain forwarding path. In this way, the service chain forwarding path is formed by linking multiple VXLAN tunnels. The SN may associate two adjacent VXLAN tunnels by using <Controller ID, Service Chain ID>, to implement seamless interconnection.

For descriptions about the intermediate forwarding device, refer to Embodiment 4. Details are not further described herein again.

Using an $i^{th}$ SN in the service chain path sequence and the manner of decreasing SNs on the service chain path on a per-hop basis as an example for description, where i is an integer that is greater than 1 but less than M, and M is a quantity of SNs included in the service chain path sequence:

the $i^{th}$ SN receives extended NLRI advertised by an $(i+1)^{th}$ SN, where a last SN in the service chain path sequence in the received extended NLRI is the $i^{th}$ SN, the received extended NLRI includes a destination identifier of the $i^{th}$ tunnel, and the destination identifier of the $i^{th}$ tunnel includes a first local service chain path identifier allocated by the $(i+1)^{th}$ SN to the service chain path identifier and an IP address of the $(i+1)^{th}$ SN;

the $i^{th}$ SN modifies the received extended NLRI, removes information of the $i^{th}$ SN in the service chain path sequence and a destination identifier of the $(i+1)^{th}$ tunnel, allocates a second local service chain path identifier to the service chain path identifier, generates the destination identifier of the $i^{th}$ tunnel, and adds the destination identifier of the $i^{th}$ tunnel to modified extended NLRI, where the destination identifier of the $i^{th}$ tunnel includes the second local service chain path identifier and an IP address of the $i^{th}$ SN;

the $i^{th}$ SN searches for a BGP route according to an identifier of an $(i-1)^{th}$ SN in the service chain path sequence, and advertises the modified extended NLRI to a BGP peer (PEER) identified by a next hop of the found BGP route, so that the modified extended NLRI is advertised to the $(i-1)^{th}$ SN; and the $i^{th}$ SN associates the second local service chain path identifier with the destination identifier of the $i^{th}$ tunnel, and generates a forwarding information table.

703. An ingress SN receives extended NLRI advertised by a downstream SN that is in the service chain path sequence and adjacent to the ingress SN, establishes an NVo3 tunnel with the downstream SN, and therefore completes establishment of an NVo3 tunnel from the ingress SN to the egress SN.

Further, optionally, in some embodiments, when a flow classifier is an independent device, the method further includes: establishing a pull-in tunnel between the flow classifier and the ingress SN of the service chain path. In this case, when associating a flow steering rule with the service chain, a service chain policy decision point may synchronously deliver a piece of flow entry information to the ingress SN of the service chain, to guide the ingress SN in disseminating service chain information carried in the extended NLRI to the related flow classifier (in this case, SN Number in the extended NLRI is 0, and no SN Sequence information exists), so as to trigger the flow classifier to establish a VXLAN tunnel with the ingress SN (namely, the pull-in tunnel described above). The flow entry information should include a network layer reachability identifier of the flow classifier and the service chain ID. A specific message bearing manner may be NetConf/RestConf or RESTful API over HTTP.

The flow classifier steers a corresponding flow to the ingress SN of the corresponding service chain path. Therefore, a whole path, from the flow classifier to the ingress SN of the service chain to the egress SN of the service chain, is formed by multiple seamlessly linked VXLANs, and the packet is forwarded with labels in the whole process. When an SN different from the egress SN on the service chain receives a flow packet steered to the service chain, the SN terminates a previous VXLAN tunnel, searches a forwarding table according to a VNI (VXLAN Network ID, VXLAN network identifier) in a VXLAN header, obtains encapsulation information of a next VXLAN tunnel and next-hop forwarding information, and then encapsulates a new VXLAN header and forwards the flow packet. When a non-SN intermediate router receives the flow packet of the service chain, the non-SN intermediate router directly searches, according to an external-layer destination IP address, for a route for forwarding. When the egress SN receives the flow packet steered to the service chain, the SN terminates the previous VXLAN tunnel, cannot find a forwarding table according to the VN ID in the VXLAN header, and therefore searches, directly in a conventional manner according to an internal-layer L2/L3 destination address in the packet, an L2/L3 forwarding information table for forwarding.

Using the $i^{th}$ SN as an example:

the $i^{th}$ SN receives a service data packet of the service chain that is sent by the $(i-1)^{th}$ SN, terminates encapsulation of an $(i-1)^{th}$ tunnel in the service data packet, and reencapsulates a tunnel encapsulation header of the $i^{th}$ tunnel, where a specific field of the tunnel encapsulation header of the $i^{th}$ tunnel is filled with the first local service chain path identifier, so that flows of different service chains are marked on tunnels between a same pair of SNs; and when the tunnel type is a VXLAN tunnel, the filled specific field is a VNI (VXLAN Network Identifier, VXLAN network identifier) field of a VXLAN header; or when the tunnel type is an NVGRE tunnel, the filled specific field is a VSI (Virtual Subnet Identifier, virtual subnet identifier) field of an NVGRE header.

In this embodiment, establishment of a service chain tunnel is described in detail above by using an example in which the tunnel type of the service chain is an NVO3 tunnel.

Embodiment 6

Figure 8A:
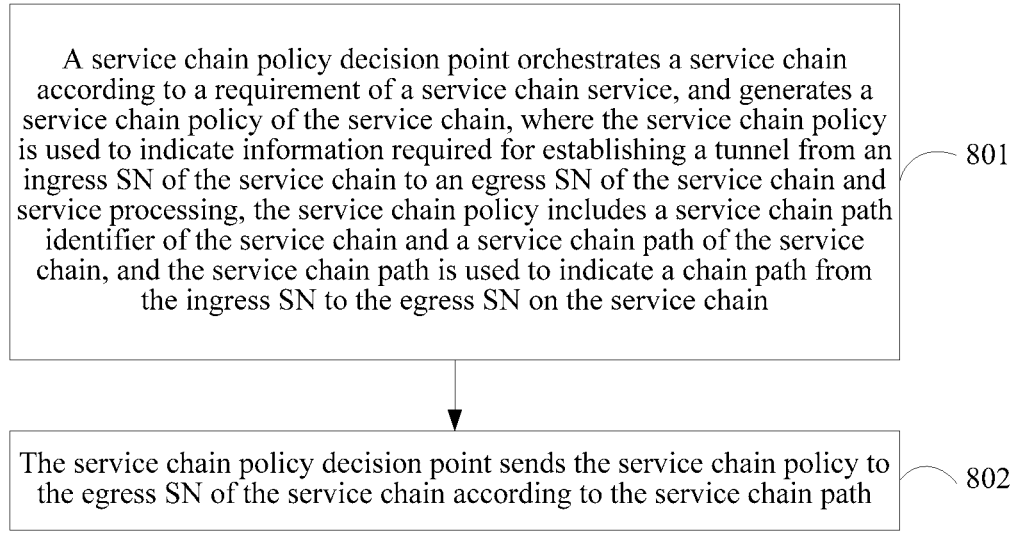
FIG. 8a is a flowchart of a method for implementing a service chain according to Embodiment 6 of the present invention.

Referring to FIG. 8a, this embodiment of the present invention further provides a method for implementing a service chain. The method is used in a service chain-enabled domain network. A service chain policy decision point, service nodes SNs configured to provide value-added services, and a service chain path that is from an ingress SN to an egress SN and orchestrated by the service chain policy decision point are deployed in the service chain-enabled domain network. The SNs include the ingress SN and the egress SN. The method may include the following steps.

801. The service chain policy decision point orchestrates a service chain according to a requirement of a service chain service, and generates a service chain policy of the service chain, where the service chain policy is used to indicate information required for establishing a tunnel from the ingress SN of the service chain to the egress SN of the service chain and service processing, the service chain policy includes a service chain path identifier of the service chain and a service chain path of the service chain, and the service chain path is used to indicate a chain path from the ingress SN to the egress SN on the service chain.

802. The service chain policy decision point sends the service chain policy to the egress SN of the service chain according to the service chain path.

Figure 8B:
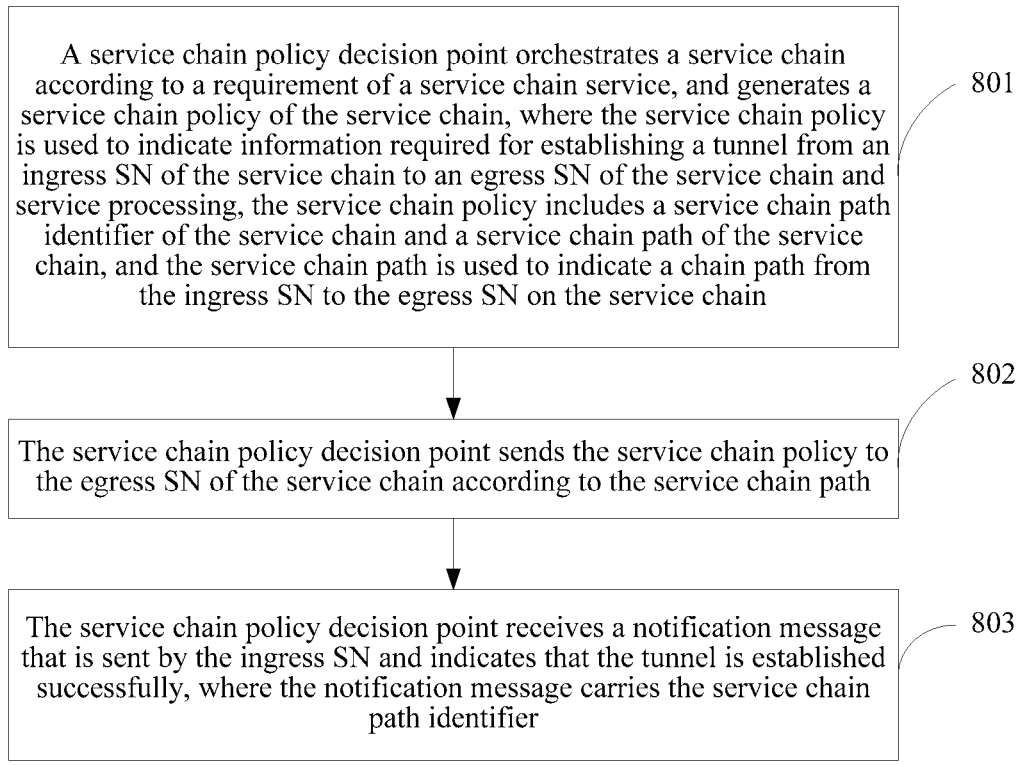
FIG. 8b is a flowchart of another method for implementing a service chain according to Embodiment 6 of the present invention.

Referring to FIG. 8b, in some embodiments of the present invention, the method may further include:

803. The service chain policy decision point receives a notification message that is sent by the ingress SN and indicates that the tunnel is established successfully, where the notification message carries the service chain path identifier.

In some embodiments of the present invention, the service chain-enabled domain network further includes a flow classifier. The flow classifier may be deployed in two manners. It may be an independent device, or may be a same device as the ingress SN (that is, the flow classifier is integrated with the ingress device). The following separately describes processing methods in the two deployment manners.

Manner 1: When the flow classifier is an independent device, the method may further include:

after the service chain policy decision point receives the notification message that is sent by the ingress SN and indicates that the tunnel is established successfully, the service chain policy decision point delivers flow entry information to the ingress SN, where the flow entry information includes information about the flow classifier, and the flow entry information is forwarded by the ingress SN to the flow classifier and used to establish a pull-in tunnel from the flow classifier to the ingress SN.

Further, optionally, the service chain policy decision point delivers an association message to the flow classifier, where the association message includes an association relationship between the service chain path identifier and a flow steering rule, and the association message is used by the ingress SN to steer a flow of the service chain to the service chain path.

Manner 2: When the flow classifier is integrated with the ingress SN, the method may further include:

after the service chain policy decision point receives the notification message that is sent by the ingress SN and indicates that the tunnel is established successfully, the service chain policy decision point delivers an association message to the ingress SN, where the association message includes an association relationship between the service chain path identifier and a flow steering rule, and the association message is used by the ingress SN to steer a flow of the service chain to the service chain path.

As can be seen from above, this embodiment of the present invention discloses a method for implementing a service chain. In the technical solution used by this method, a service chain policy decision point generates a service chain policy, where the service chain policy includes a service chain path identifier and a service chain path; and the service chain policy decision point sends the service chain policy to an egress SN, where the service chain policy is used to indicate information required for establishing a tunnel from the ingress SN to the egress SN and service processing. The following technical effects are achieved:

The service chain policy decision point only needs to deliver the service chain policy including the service chain path identifier and the service chain path to the egress SN of the service chain, the service chain policy may be disseminated to the ingress SN of the service chain, and a chain path of the service chain is automatically established. Therefore, automatic service chain deployment is implemented, a service chain deployment operation is simplified, and service chain deployment difficulty is reduced.

The service chain policy decision point only needs to interact with the egress SN, without delivering the service chain policy to each SN separately, monitoring a route reachability status of each service node, or performing multipoint control and coordination. This reduces objects that interact with the service chain policy decision point, and therefore reduces computation and processing load of the service chain policy decision point. Therefore, operation, administration and maintenance are simple, extensibility is high, and deployment is easy.

For better implementing the foregoing solutions of the embodiments of the present invention, the following further provides related apparatuses used in cooperation for implementing the foregoing solutions.

Embodiment 7

Figure 9A:
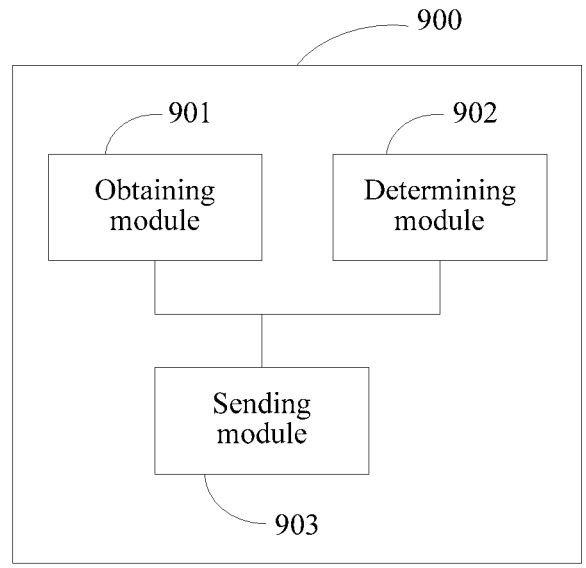
FIG. 9a is a schematic diagram of a service node according to Embodiment 7 of the present invention.

Referring to FIG. 9a, this embodiment of the present invention provides a service node (SN) 900, used as an egress SN and used in a service chain-enabled domain network. A service chain policy decision point, an ingress SN, the egress SN, and a service chain path that is from the ingress SN to the egress SN and orchestrated by the service chain policy decision point are deployed in the service chain-enabled domain network. The egress SN includes:

an obtaining module 901, configured to obtain a service chain path identifier and a first service chain path, where the service chain path identifier is used to identify the service chain path, and the first service chain path is the service chain path from the ingress SN to the egress SN;

a determining module 902, configured to determine an upstream SN that is on the first service chain path and immediately adjacent to the egress SN; and a sending module 903, configured to send an extended Border Gateway Protocol BGP packet to the upstream SN, where the extended BGP packet includes the service chain path identifier and a second service chain path, and the second service chain path is a path including a service chain path from the ingress SN to the upstream SN.

The second service chain path may be the service chain path from the ingress SN to the upstream SN, and in this case, it means that the egress SN generates the second service chain path after removing the egress SN from the first service chain path; or the second service chain path may be the service chain path from the ingress SN to the egress SN, and in this case, it means that the second service chain path and the first service chain path are the same.

Figure 9B:
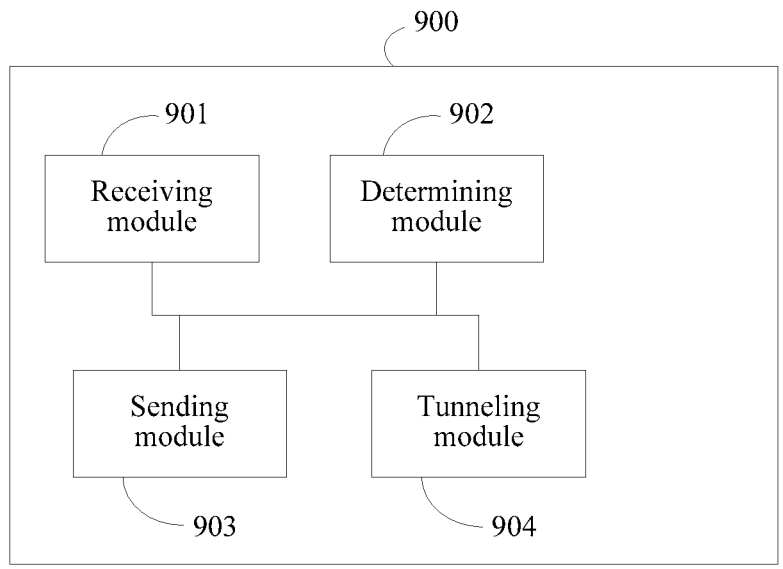
FIG. 9b is a schematic diagram of another service node according to Embodiment 7 of the present invention.

Further, optionally, as shown in FIG. 9b, in some embodiments of the present invention, the obtaining module 901 is further configured to obtain a tunnel type; and the egress SN further includes a tunneling module 904, where when the tunnel type is a label switched path LSP tunnel, the tunneling module 904 allocates a label to the service chain path, and adds the label to the extended BGP packet; or when the tunnel type is a network virtualization over layer 3 NVO3 tunnel, the tunneling module 904 allocates a local service chain path identifier to the service chain path, generates a tunnel destination identifier according to the local service chain path identifier and an IP address of the egress SN, and adds the tunnel destination identifier to the extended BGP packet.

The egress SN shown in FIG. 9a and FIG. 9b is a network device corresponding to the method for implementing a service chain shown in Embodiment 1. Refer to descriptions about the method shown in Embodiment 1. Details are not further described herein again.

As can be seen from above, in some feasible implementations of the present invention, a service node 900 is disclosed and used as an egress SN. In the technical solution, an egress SN on a service chain path only needs to receive a service chain policy that includes a service chain path identifier and a service chain path and is sent by a service chain policy decision point, the service chain policy may be disseminated to an ingress SN on the service chain path, and a chain path of a service chain is automatically established. Therefore, a service chain deployment operation is simplified, and service chain deployment difficulty is reduced.

Embodiment 8

Figure 10A:
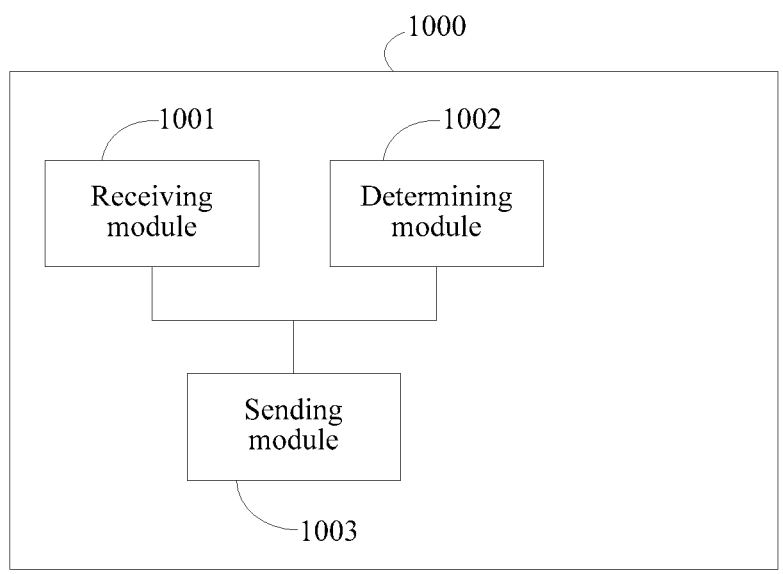
FIG. 10a is a schematic diagram of a service node according to Embodiment 8 of the present invention.

Referring FIG. 10a, this embodiment of the present invention provides a service node (SN) 1000, used as an intermediate SN and used in a service chain-enabled domain network. A service chain policy decision point, an ingress SN, the intermediate SN, an egress SN, and a service chain path that is from the ingress SN to the egress SN through the intermediate SN and orchestrated by the service chain policy decision point are deployed in the service chain-enabled domain network. The intermediate SN includes:

a receiving module 1001, configured to receive an extended first Border Gateway Protocol BGP packet sent by a downstream SN that is on the service chain path and immediately adjacent to the intermediate SN, where the extended first BGP packet includes the service chain path identifier and the first service chain path, the service chain path identifier is used to identify the service chain path, and the first service chain path is a path including a service chain path from the ingress SN to the intermediate SN;

a determining module 1002, configured to determine an upstream SN that is on the first service chain path and immediately adjacent to the SN; and a sending module 1003, configured to send an extended second BGP packet to the upstream SN, where the extended second BGP packet includes the service chain path identifier and a second service chain path, and the second service chain path is a path including a service chain path from the ingress SN to the upstream SN.

The first service chain path may be the service chain path from the ingress SN to the intermediate SN; correspondingly, the second service chain path may be the service chain path from the ingress SN to the upstream SN. This means that in a process of transferring the service chain path from the egress SN to the ingress SN, an SN is removed from the service chain path every time an SN is passed through. Therefore, the service chain path that is transferred is gradually shortened and changed.

Alternatively, the first service chain path may be the service chain path from the ingress SN to the egress SN; correspondingly, the second service chain path may be the service chain path from the ingress SN to the egress SN. This means that in a process of transferring the service chain path from the egress SN to the ingress SN, the service chain path is not shortened. The complete service chain path is always transferred.

Figure 10B:
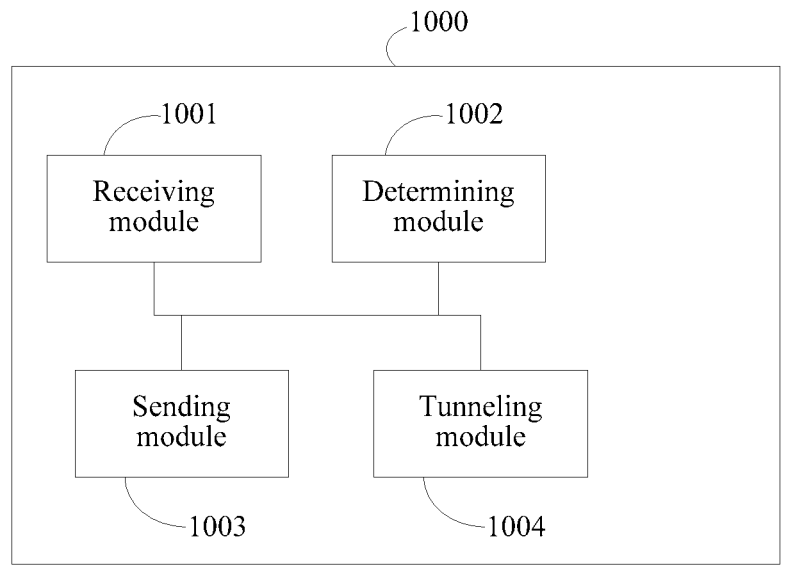
FIG. 10b is a schematic diagram of another service node according to Embodiment 8 of the present invention.

Further, optionally, as shown in FIG. 10*b*, in some embodiments of the present invention, the intermediate SN further includes:

a tunneling module 1004, configured to: after the receiving module receives the extended first BGP packet, establish, by the tunneling module, a first tunnel from the intermediate SN to the downstream SN with the downstream SN, and link the first tunnel to a second tunnel to form one tunnel according to the service chain path identifier, where the second tunnel is a tunnel that is from the upstream SN to the intermediate SN and established by the upstream SN with the intermediate SN.

Optionally, the extended first BGP packet further includes a tunnel type, the tunnel type may include at least a label switched path LSP tunnel and a network virtualization over layer 3 NVO3 tunnel. Specific processing manners are as follows:

Manner 1: When the tunnel type is an LSP tunnel, the tunneling module includes:

an obtaining unit, configured to obtain a first label from the extended first BGP packet, where the first label is a label allocated by the downstream SN to the service chain path identifier;

an establishing unit, configured to establish the first tunnel with the downstream SN, where the first tunnel is an LSP tunnel from the intermediate SN to the downstream SN;

an allocation unit, configured to allocate a second label to the service chain path identifier, and add the second label to the extended second BGP packet, where the second label is used by the upstream SN to establish the second tunnel with the intermediate SN, and the second tunnel is an LSP tunnel from the upstream SN to the intermediate SN; and an association unit, configured to associate the second label with the first label according to the service chain path identifier, and generate a label forwarding table, where the second label is used as an incoming label, and the first label is used as an outgoing label, so that the first tunnel is linked to the second tunnel to form one tunnel.

Manner 2: When the tunnel type is an NVO3 tunnel, the tunneling module includes:

an obtaining unit, configured to obtain a first tunnel destination identifier from the extended first BGP packet, where the first tunnel destination identifier includes an IP address of the downstream SN and a first local service chain path identifier allocated by the downstream SN to the service chain path;

an establishing unit, configured to establish the first tunnel with the downstream SN, where the first tunnel is an NVO3 tunnel from the intermediate SN to the downstream SN;

an allocation unit, configured to allocate a second local service chain path identifier to the service chain path, generate a second tunnel destination identifier according to the second local service chain path identifier, and add the second tunnel destination identifier to the extended second BGP packet, where the second tunnel destination identifier includes an IP address of the intermediate SN and the second local service chain path identifier, the second tunnel destination identifier is used by the upstream SN to establish the second tunnel with the intermediate SN, and the second tunnel is an NVO3 tunnel from the upstream SN to the intermediate SN; and an association unit, configured to associate the second tunnel destination identifier with the first tunnel destination identifier according to the service chain path identifier, and generate a forwarding information table, so that the first tunnel is linked to the second tunnel to form one tunnel.

Optionally, the NVO3 tunnel is specifically a virtual extensible local area network VXLAN tunnel or a network virtualization using generic routing encapsulation NVGRE tunnel, and the intermediate SN further includes:

the receiving module 1001 receives a service data packet of the service chain that is sent by the upstream SN, terminates a tunnel encapsulation header of the second tunnel in the service data packet, and reencapsulates a tunnel encapsulation header of the first tunnel, where a specific field of the tunnel encapsulation header of the first tunnel is filled with the first local service chain path identifier, where when the tunnel type is a VXLAN tunnel, the filled specific field is a VXLAN network identifier VNI field of a VXLAN header; or when the tunnel type is an NVGRE tunnel, the filled specific field is a virtual subnet identifier VSI field of an NVGRE header.

It may be understood that, functions of each functional module of the service node in this embodiment of the present invention may be implemented specifically according to the method in the foregoing Embodiment 2. For a specific implementation process thereof, refer to related descriptions in the foregoing method embodiment. Details are not further described herein again.

As can be seen from above, in some feasible implementations of the present invention, a service node 1000 is disclosed and used as an intermediate SN. In the technical solution, the intermediate SN receives, by using a receiving module 1001, an extended first Border Gateway Protocol BGP packet sent by a downstream SN that is on the service chain path and immediately adjacent to the intermediate SN; determines, by using a determining module 1002, an upstream SN that is on the first service chain path and immediately adjacent to the SN; and sends, by using a sending module 1003, an extended second BGP packet to the upstream SN. Therefore, this avoids a direct interaction between a service chain policy decision point and the intermediate SN, and reduces computation and processing load of the service chain policy decision point. Therefore, operation, administration and maintenance are simpler, and extensibility is higher. In addition, this helps implement automatic service chain deployment, and helps reduce service chain deployment difficulty.

Embodiment 9

Figure 11A:
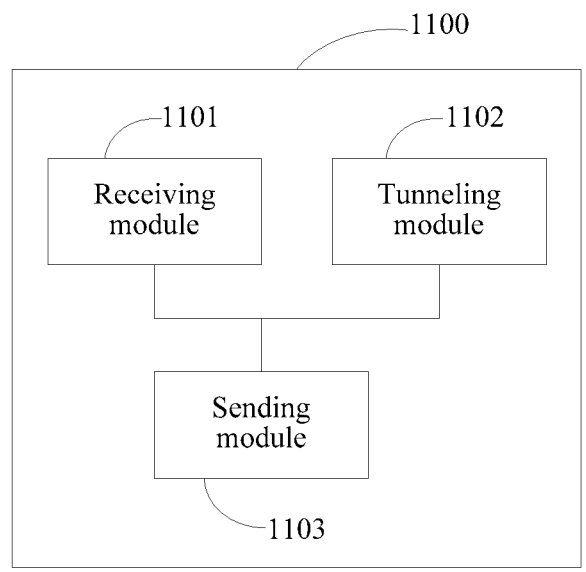
FIG. 11a is a schematic structural diagram of a service node according to Embodiment 9 of the present invention.

Referring to FIG. 11a, this embodiment of the present invention provides a service node (SN) 1100, used as an ingress SN and used in a service chain-enabled domain network. A service chain policy decision point, the ingress SN, an egress SN, and a service chain path that is from the ingress SN to the egress SN and orchestrated by the service chain policy decision point are deployed in the service chain-enabled domain network. The ingress SN includes:

a receiving module 1101, configured to receive an extended BGP packet sent by a downstream SN that is on the service chain path and immediately adjacent to the ingress SN, where the extended BGP packet includes a service chain path identifier and a first service chain path, the service chain path identifier is used to identify the service chain path, and the first service chain path is a path including the ingress SN;

a tunneling module 1102, configured to establish a tunnel from the ingress SN to the downstream SN with the downstream SN; and a sending module 1103, configured to send a notification message to the service chain policy decision point after the tunnel is established successfully, where the notification message carries the service chain path identifier.

The first service chain path may be the ingress SN; this means that in a process of transferring the service chain path from the egress SN to the ingress SN, an SN is removed from the service chain path every time an SN is passed through, and when the service chain path arrives at the ingress SN, only the ingress SN remains on the service chain path. Alternatively, the first service chain path may be the service chain path from the ingress SN to the egress SN; this means that in a process of transferring the service chain path from the egress SN to the ingress SN, the service chain path is not shortened, and the complete service chain path is always transferred.

In some embodiments of the present invention, the service chain-enabled domain network further includes a flow classifier. The flow classifier may be deployed in two manners. It may be an independent device, or may be a same device as the ingress SN (that is, the flow classifier is integrated with the ingress device). The following separately describes the ingress SN in the two deployment manners.

Manner 1: When the flow classifier is an independent device, the SN further includes:

the receiving module 1101 receives flow entry information sent by the service chain policy decision point, where the flow entry information includes information about the flow classifier;

the sending module 1103 disseminates the extended BGP packet to the flow classifier, where the extended BGP packet is used by the flow classifier to establish a pull-in tunnel from the flow classifier to the ingress SN with the ingress SN; and the tunneling module 1102 establishes the tunnel from the flow classifier to the ingress SN with the flow classifier.

Figure 11B:
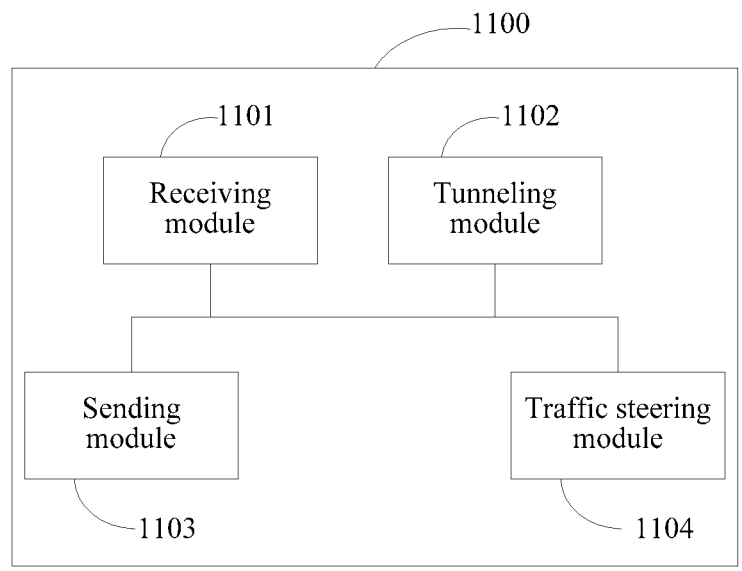
FIG. 11b is a schematic structural diagram of another service node according to Embodiment 9 of the present invention.

Manner 2: Referring to FIG. 11b, when the flow classifier is integrated with the ingress SN, the ingress SN further includes:

the receiving module 1101 receives an association message delivered by the service chain policy decision point, where the association message includes an association relationship between the service chain path identifier and a flow steering rule; and the ingress SN further includes a traffic steering module 1104, configured to steer a flow of the service chain to the service chain path according to the association relationship.

It may be understood that, functions of each functional module of the service node in this embodiment of the present invention may be implemented specifically according to the method in the foregoing method Embodiment 3. For a specific implementation process thereof, refer to related descriptions in the foregoing method embodiment. Details are not further described herein again.

As can be seen from above, in some feasible implementations of the present invention, a service node 1100 is disclosed and used as an ingress SN. In the technical solution, after obtaining an extended BGP packet sent by a downstream SN, the ingress SN establishes a tunnel with the downstream SN, without obtaining an instruction that is used for establishing a tunnel and delivered by a service chain policy decision point. Therefore, this reduces interactions between the service chain policy decision point and the ingress SN, and reduces computation and processing load of the service chain policy decision point. Therefore, operation, administration and maintenance are simpler, and extensibility is higher. In addition, this helps implement automatic service chain deployment, and helps reduce service chain deployment difficulty.

Embodiment 10

Figure 12A:
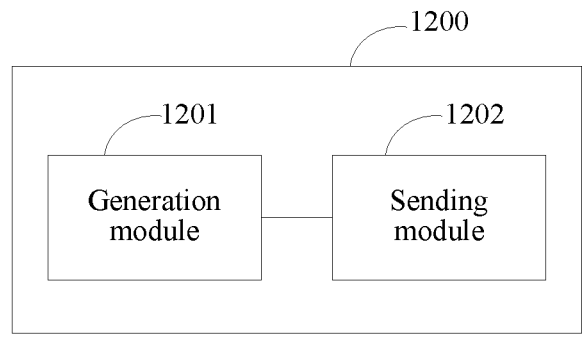
FIG. 12a is a schematic structural diagram of a service chain policy decision point according to Embodiment 10 of the present invention.
Figure 12B:
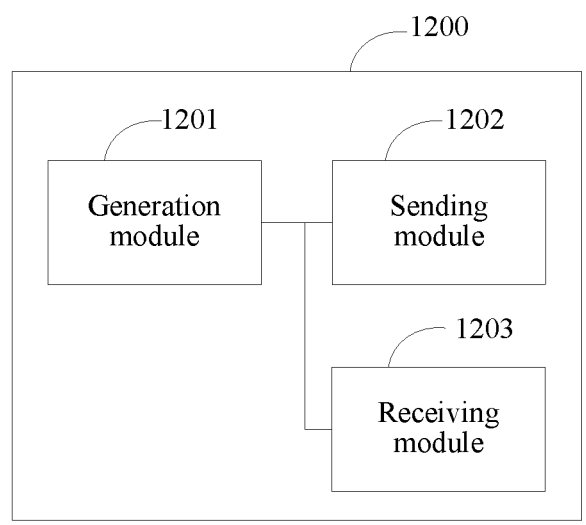
FIG. 12b is a schematic structural diagram of another service chain policy decision point according to Embodiment 10 of the present invention.

Referring to FIG. 12a, this embodiment of the present invention provides a service chain policy decision point 1200, used in a service chain-enabled domain network. The service chain policy decision point includes:

a generation module 1201, configured to orchestrate a service chain according to a requirement of a service chain service, and generate a service chain policy of the service chain, where the service chain policy is used to indicate information required for establishing a tunnel from an ingress SN of the service chain to an egress SN of the service chain and service processing, the service chain policy includes a service chain path identifier of the service chain and a service chain path of the service chain, and the service chain path is used to indicate a chain path from the ingress SN to the egress SN on the service chain; and a sending module 1202, configured to send the service chain policy to the egress SN of the service chain according to the service chain path.

Optionally, the service chain policy decision point 1200 further includes:

a receiving module 1203, configured to receive a notification message that is sent by the ingress SN and indicates that the tunnel is established successfully, where the notification message carries the service chain path identifier.

Further, optionally, the service chain-enabled domain network further includes a flow classifier. The flow classifier may be deployed in two manners. It may be an independent device, or may be a same device as the ingress SN (that is, the flow classifier is integrated with the ingress device). The following separately describes the service chain policy decision point 1200 in the two deployment manners.

Manner 1: When the flow classifier is an independent device, the service chain policy decision point 1200 further includes:

after the receiving module 1203 receives the notification message, the sending module 1202 is configured to send flow entry information to the ingress SN, where the flow entry information includes information about the flow classifier, and the flow entry information is forwarded by the ingress SN to the flow classifier and used to establish a pull-in tunnel from the flow classifier to the ingress SN.

Optionally, the sending module 1202 is further configured to deliver an association message to the flow classifier, where the association message includes an association relationship between the service chain path identifier and a flow steering rule, and the association message is used by the ingress SN to steer a flow of the service chain to the service chain path.

Manner 2: When the flow classifier is integrated with the ingress SN, the service chain policy decision point 1200 may further include:

after the receiving module 1203 receives the notification message, the sending module 1202 is configured to send an association message to the ingress SN, where the association message includes an association relationship between the service chain path identifier and a flow steering rule, and the association message is used by the ingress SN to steer a flow of the service chain to the service chain path.

It may be understood that, functions of each functional module of the service node in this embodiment of the present invention may be implemented specifically according to the method in the foregoing method Embodiment 4. For a specific implementation process thereof, refer to related descriptions in the foregoing method embodiment. Details are not further described herein again.

As can be seen from above, in some feasible implementations of the present invention, a service chain policy decision point 1200 is disclosed. In the technical solution, the service chain policy decision point 1200 only needs to deliver a service chain policy including a service chain path identifier and a service chain path to an egress SN of a service chain, the service chain policy may be disseminated to an ingress SN of the service chain, and a chain path of the service chain is automatically established. Therefore, automatic service chain deployment is implemented, a service chain deployment operation is simplified, and service chain deployment difficulty is reduced.

The service chain policy decision point 1200 only needs to interact with the egress SN, without delivering the service chain policy to each SN separately, monitoring a route reachability status of each service node, or performing multipoint control and coordination. This reduces objects that interact with the service chain policy decision point, and therefore reduces computation and processing load of the service chain policy decision point. Therefore, operation, administration and maintenance are simple, and extensibility is high.

An embodiment of the present invention further provides a computer storage medium, where the computer storage medium may store a program, and when the program is executed, some or all steps of the method for implementing a service chain described in the foregoing method embodiment are performed.

Figure 13:
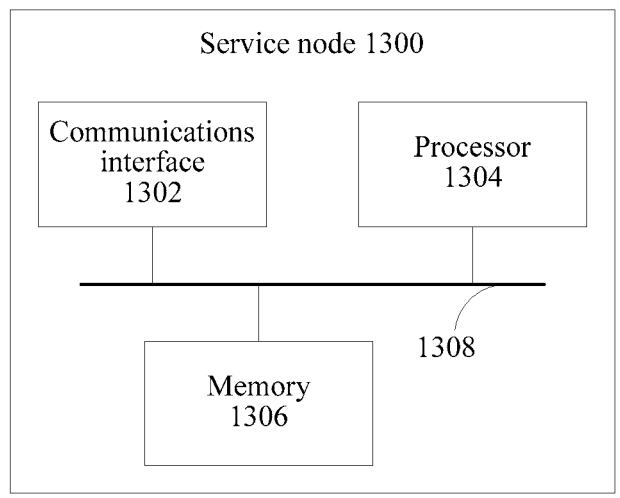
FIG. 13 is a schematic structural diagram of another service node according to an embodiment of the present invention.

Referring to FIG. 13, an embodiment of the present invention further provides a service node (SN) 1300, used as an egress SN and used in a service chain-enabled domain network. A service chain policy decision point, an ingress SN, the egress SN, and a service chain path that is from the ingress SN to the egress SN and orchestrated by the service chain policy decision point are deployed in the service chain-enabled domain network.

The service node 1300 may be a micro processing computer. For example, the service node 1300 may be one of portable devices such as a general-purpose computer, a customized machine, a mobile phone terminal, or a tablet. The service node 1300 includes a processor 1304, a memory 1306, a communications interface 1302, and a bus 1308. The processor 1304, the memory 1306, and the communications interface 1302 are connected by the bus 1308 and communicate with each other.

The bus 1308 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The bus may be categorized as one or more of an address bus, a data bus, a control bus, or the like. For ease of denotation, the bus in FIG. 13 is denoted by only a bold line. However, this does not mean that only one bus or one type of bus exists.

The memory 1306 is configured to store executable program code, where the program code includes a computer operation instruction. When the service node 1300 executes the program code, the service node 1300 may complete steps 301 to 303 in Embodiment 1, or may implement all functions of the service node 900 in Embodiment 7. The memory 1306 may include a high speed RAM (Ramdom Access Memory) memory. Optionally, the memory 1306 may further include a non-volatile memory (non-volatile memory). For example, the memory 1306 may include a magnetic disk storage.

The processor 1304 may be a central processing unit (Central Processing Unit, CPU for short), or the processor 1304 may be a specific integrated circuit (Application Specific Integrated Circuit, ASIC for short), or the processor 1304 may be configured as one or more integrated circuits for implementing an embodiment of the present invention.

The communications interface 1302 is configured to obtain a service chain path identifier and a first service chain path, where the service chain path identifier is used to identify the service chain path, and the first service chain path is the service chain path from the ingress SN to the egress SN.

The processor 1304 is configured to determine an upstream SN that is on the first service chain path and immediately adjacent to the egress SN.

The communications interface 1302 is further configured to send an extended Border Gateway Protocol BGP packet to the upstream SN, where the extended BGP packet includes the service chain path identifier and a second service chain path, and the second service chain path is a path including a service chain path from the ingress SN to the upstream SN.

The second service chain path may be the service chain path from the ingress SN to the upstream SN, and in this case, it means that the egress SN generates the second service chain path after removing the egress SN from the first service chain path; or the second service chain path may be the service chain path from the ingress SN to the egress SN, and in this case, it means that the second service chain path and the first service chain path are the same.

Optionally, the communications interface 1302 is further configured to obtain a tunnel type.

When the tunnel type is a label switched path LSP tunnel, the processor 1304 further allocates a label to the service chain path, and adds the label to the extended BGP packet; or when the tunnel type is a network virtualization over layer 3 NVO3 tunnel, the processor 1304 further allocates a local service chain path identifier to the service chain path, generates a tunnel destination identifier according to the local service chain path identifier and an IP address of the egress SN, and adds the tunnel destination identifier to the extended BGP packet.

It should be noted that, each functional unit of the service node 1300 provided by this embodiment of the present invention may be a specific implementation of a function of the apparatus provided by Embodiment 7 based on the method provided by Embodiment 1. Definitions and descriptions of terms keep consistent with those in Embodiment 1 and Embodiment 7. Details are not further described herein again.

As can be seen from above, in some feasible implementations of the present invention, a service node 1300 is disclosed and used as an egress SN. In the technical solution, an egress SN on a service chain path only needs to receive a service chain policy that includes a service chain path identifier and a service chain path and is sent by a service chain policy decision point, the service chain policy may be disseminated to an ingress SN on the service chain path, and a chain path of a service chain is automatically established. Therefore, a service chain deployment operation is simplified, and service chain deployment difficulty is reduced.

Figure 14:
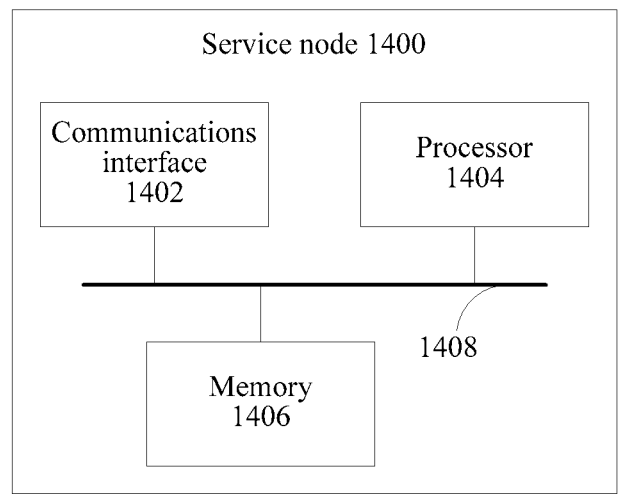
FIG. 14 is a schematic structural diagram of still another service node according to an embodiment of the present invention.

Referring to FIG. 14, an embodiment of the present invention further provides a service node 1400, used as an intermediate SN and used in a service chain-enabled domain network. A service chain policy decision point, an ingress SN, the intermediate SN, an egress SN, and a service chain path that is from the ingress SN to the egress SN through the intermediate SN and orchestrated by the service chain policy decision point are deployed in the service chain-enabled domain network.

The service node 1400 may be a micro processing computer. For example, the service node 1400 may be one of portable devices such as a general-purpose computer, a customized machine, a mobile phone terminal, or a tablet. The service node 1400 includes a processor 1404, a memory 1406, a communications interface 1402, and a bus 1408. The processor 1404, the memory 1406, and the communications interface 1402 are connected by the bus 1408 and communicate with each other.

The bus 1408 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The bus may be categorized as one or more of an address bus, a data bus, a control bus, or the like. For ease of denotation, the bus in FIG. 14 is denoted by only a bold line. However, this does not mean that only one bus or one type of bus exists.

The memory 1406 is configured to store executable program code, where the program code includes a computer operation instruction. When the service node 1400 executes the program code, the service node 1400 may complete steps 401 to 403 in Embodiment 2, or may implement all functions of the service node 1000 in Embodiment 8. The memory 1406 may include a high speed RAM (Ramdom Access Memory) memory. Optionally, the memory 1406 may further include a non-volatile memory (non-volatile memory). For example, the memory 1406 may include a magnetic disk storage.

The processor 1404 may be a central processing unit (Central Processing Unit, CPU for short), or the processor 1404 may be a specific integrated circuit (Application Specific Integrated Circuit, ASIC for short), or the processor 1404 may be configured as one or more integrated circuits for implementing an embodiment of the present invention.

The communications interface 1402 is configured to receive an extended first Border Gateway Protocol BGP packet sent by a downstream SN that is on the service chain path and immediately adjacent to the intermediate SN, where the extended first BGP packet includes the service chain path identifier and the first service chain path, the service chain path identifier is used to identify the service chain path, and the first service chain path is a path including a service chain path from the ingress SN to the intermediate SN.

The processor 1404 is configured to perform an operation of determining an upstream SN that is on the first service chain path and immediately adjacent to the SN.

The communications interface 1402 is further configured to send an extended second BGP packet to the upstream SN, where the extended second BGP packet includes the service chain path identifier and a second service chain path, and the second service chain path is a path including a service chain path from the ingress SN to the upstream SN.

The first service chain path may be the service chain path from the ingress SN to the intermediate SN; correspondingly, the second service chain path may be the service chain path from the ingress SN to the upstream SN. This means that in a process of transferring the service chain path from the egress SN to the ingress SN, an SN is removed from the service chain path every time an SN is passed through. Therefore, the service chain path that is transferred is gradually shortened and changed.

Alternatively, the first service chain path may be the service chain path from the ingress SN to the egress SN; correspondingly, the second service chain path may be the service chain path from the ingress SN to the egress SN. This means that in a process of transferring the service chain path from the egress SN to the ingress SN, the service chain path is not shortened. The complete service chain path is always transferred.

Optionally, after the communications interface 1402 receives the extended first BGP packet, the processor 1404 establishes a first tunnel from the intermediate SN to the downstream SN with the downstream SN, and links the first tunnel to a second tunnel to form one tunnel according to the service chain path identifier, where the second tunnel is a tunnel that is from the upstream SN to the intermediate SN and established by the upstream SN with the intermediate SN.

Optionally, the extended first BGP packet further includes a tunnel type, the tunnel type may include at least a label switched path LSP tunnel and a network virtualization over layer 3 NVO3 tunnel. Specific processing manners are as follows:

Manner 1: When the tunnel type is an LSP tunnel, the processor 1404 is further configured to: perform an operation of obtaining a first label from the extended first BGP packet, where the first label is a label allocated by the downstream SN to the service chain path identifier; perform an operation of establishing the first tunnel with the downstream SN, where the first tunnel is an LSP tunnel from the intermediate SN to the downstream SN; perform operations of allocating a second label to the service chain path identifier, and adding the second label to the extended second BGP packet, where the second label is used by the upstream SN to establish the second tunnel with the intermediate SN, and the second tunnel is an LSP tunnel from the upstream SN to the intermediate SN; and perform operations of associating the second label with the first label according to the service chain path identifier, and generating a label forwarding table, where in the label forwarding table, the second label is used as an incoming label, and the first label is used as an outgoing label, so that the first tunnel is linked to the second tunnel to form one tunnel.

Manner 2: When the tunnel type is an NVO3 tunnel, the processor 1404 is further configured to: perform an operation of obtaining a first tunnel destination identifier from the extended first BGP packet, where the first tunnel destination identifier includes an IP address of the downstream SN and a first local service chain path identifier allocated by the downstream SN to the service chain path; perform an operation of establishing the first tunnel with the downstream SN, where the first tunnel is an NVO3 tunnel from the intermediate SN to the downstream SN; perform operations of allocating a second local service chain path identifier to the service chain path, generating a second tunnel destination identifier according to the second local service chain path identifier, and adding the second tunnel destination identifier to the extended second BGP packet, where the second tunnel destination identifier includes an IP address of the intermediate SN and the second local service chain path identifier, the second tunnel destination identifier is used by the upstream SN to establish the second tunnel with the intermediate SN, and the second tunnel is an NVO3 tunnel from the upstream SN to the intermediate SN; and perform operations of associating the second tunnel destination identifier with the first tunnel destination identifier according to the service chain path identifier, and generating a forwarding information table, so that the first tunnel is linked to the second tunnel to form one tunnel.

Optionally, the NVO3 tunnel is specifically a virtual extensible local area network VXLAN tunnel or a network virtualization using generic routing encapsulation NVGRE tunnel, and the intermediate SN further includes:

the communications interface 1402 receives a service data packet of the service chain that is sent by the upstream SN, terminates a tunnel encapsulation header of the second tunnel in the service data packet, and reencapsulates a tunnel encapsulation header of the first tunnel, where a specific field of the tunnel encapsulation header of the first tunnel is filled with the first local service chain path identifier, where when the tunnel type is a VXLAN tunnel, the filled specific field is a VXLAN network identifier VNI field of a VXLAN header; or when the tunnel type is an NVGRE tunnel, the filled specific field is a virtual subnet identifier VSI field of an NVGRE header.

It should be noted that, each functional unit of the service node 1400 provided by this embodiment of the present invention may be a specific implementation of a function of the apparatus provided by Embodiment 8 based on the method provided by Embodiment 2. Definitions and descriptions of terms keep consistent with those in Embodiment 2 and Embodiment 8. Details are not further described herein again.

As can be seen from above, in some feasible implementations of the present invention, a service node 1400 is disclosed and used as an intermediate SN. In the technical solution, the intermediate SN receives an extended first Border Gateway Protocol BGP packet sent by a downstream SN that is on the service chain path and immediately adjacent to the intermediate SN; determines an upstream SN that is on the first service chain path and immediately adjacent to the SN; and sends an extended second BGP packet to the upstream SN, so that a tunnel from the intermediate SN to the downstream SN is linked to a tunnel from the upstream SN to the intermediate SN. Therefore, this avoids a direct interaction between a service chain policy decision point and the intermediate SN, and reduces computation and processing load of the service chain policy decision point. Therefore, operation, administration and maintenance are simpler, and extensibility is higher. In addition, this helps implement automatic service chain deployment, and helps reduce service chain deployment difficulty.

Figure 15:
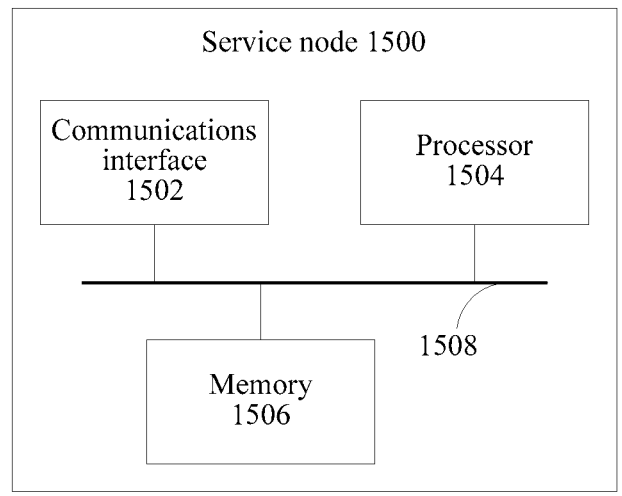
FIG. 15 is a schematic structural diagram of yet another service node according to an embodiment of the present invention.

Referring to FIG. 15, an embodiment of the present invention further provides a service node 1500, used as an ingress SN and used in a service chain-enabled domain network. A service chain policy decision point, the ingress SN, an egress SN, and a service chain path that is from the ingress SN to the egress SN and orchestrated by the service chain policy decision point are deployed in the service chain-enabled domain network.

The service node 1500 may be a micro processing computer. For example, the service node 1500 may be one of portable devices such as a general-purpose computer, a customized machine, a mobile phone terminal, or a tablet. The service node 1500 includes a processor 1504, a memory 1506, a communications interface 1502, and a bus 1508. The processor 1504, the memory 1506, and the communications interface 1502 are connected by the bus 1508 and communicate with each other.

The bus 1508 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The bus may be categorized as one or more of an address bus, a data bus, a control bus, or the like. For ease of denotation, the bus in FIG. 15 is denoted by only a bold line. However, this does not mean that only one bus or one type of bus exists.

The memory 1506 is configured to store executable program code, where the program code includes a computer operation instruction. When the service node 1500 executes the program code, the service node 1500 may complete steps 501 to 503 in Embodiment 3, or may implement all functions of the service node 1100 in Embodiment 9. The memory 1506 may include a high speed RAM (Ramdom Access Memory) memory. Optionally, the memory 1506 may further include a non-volatile memory (non-volatile memory). For example, the memory 1506 may include a magnetic disk storage.

The processor 1504 may be a central processing unit (Central Processing Unit, CPU for short), or the processor 1504 may be a specific integrated circuit (Application Specific Integrated Circuit, ASIC for short), or the processor 1504 may be configured as one or more integrated circuits for implementing an embodiment of the present invention.

The communications interface 1502 is configured to receive an extended BGP packet sent by a downstream SN that is on the service chain path and immediately adjacent to the ingress SN, where the extended BGP packet includes a service chain path identifier and a first service chain path, the service chain path identifier is used to identify the service chain path, and the first service chain path is a path including the ingress SN.

The processor 1504 is configured to establish a tunnel from the ingress SN to the downstream SN with the downstream SN.

The communications interface 1502 is further configured to send a notification message to the service chain policy decision point after the tunnel is established successfully, where the notification message carries the service chain path identifier.

The first service chain path may be the ingress SN; this means that in a process of transferring the service chain path from the egress SN to the ingress SN, an SN is removed from the service chain path every time an SN is passed through, and when the service chain path arrives at the ingress SN, only the ingress SN remains on the service chain path. Alternatively, the first service chain path may be the service chain path from the ingress SN to the egress SN; this means that in a process of transferring the service chain path from the egress SN to the ingress SN, the service chain path is not shortened, and the complete service chain path is always transferred.

In some embodiments of the present invention, the service chain-enabled domain network further includes a flow classifier. The flow classifier may be deployed in two manners. It may be an independent device, or may be a same device as the ingress SN (that is, the flow classifier is integrated with the ingress device). The following separately describes the ingress SN in the two deployment manners.

Manner 1: When the flow classifier is an independent device, the SN further includes:

the communications interface 1502 performs an operation of receiving flow entry information sent by the service chain policy decision point, where the flow entry information includes information about the flow classifier; and performs an operation of disseminating the extended BGP packet to the flow classifier, where the extended BGP packet is used by the flow classifier to establish a pull-in tunnel from the flow classifier to the ingress SN with the ingress SN.

The processor 1504 performs an operation of establishing the tunnel from the flow classifier to the ingress SN with the flow classifier.

Manner 2: When the flow classifier is integrated with the ingress SN, the ingress SN further includes:

the communications interface 1502 performs an operation of receiving an association message delivered by the service chain policy decision point, where the association message includes an association relationship between the service chain path identifier and a flow steering rule; and steers a flow of the service chain to the service chain path according to the association relationship.

It should be noted that, each functional unit of the service node provided by this embodiment of the present invention may be a specific implementation of a function of the apparatus provided by Embodiment 9 based on the method provided by Embodiment 3. Definitions and descriptions of terms keep consistent with those in Embodiment 3 and Embodiment 9. Details are not further described herein again.

As can be seen from above, in some feasible implementations of the present invention, a service node 1500 is disclosed and used as an ingress SN. In the technical solution, after obtaining an extended BGP packet sent by a downstream SN, the ingress SN establishes a tunnel with the downstream SN, without obtaining an instruction that is used for establishing a tunnel and delivered by a service chain policy decision point. Therefore, this reduces interactions between the service chain policy decision point and the ingress SN, and reduces computation and processing load of the service chain policy decision point. Therefore, operation, administration and maintenance are simpler, and extensibility is higher. In addition, this helps implement automatic service chain deployment, and helps reduce service chain deployment difficulty.

Figure 16:
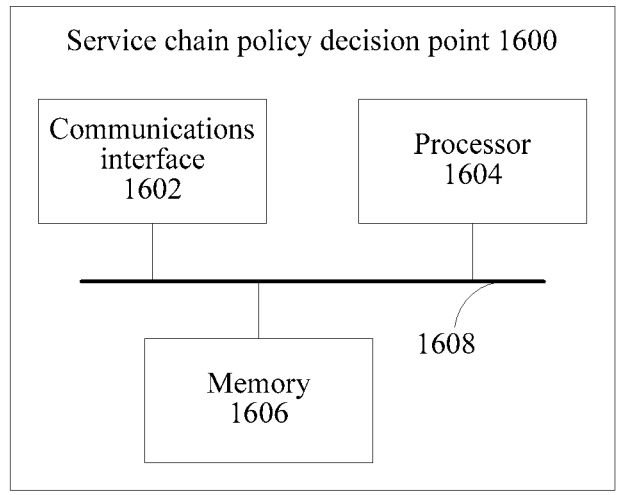
FIG. 16 is a schematic structural diagram of another service chain policy decision point according to an embodiment of the present invention.

Referring to FIG. 16, an embodiment of the present invention further provides a service chain policy decision point 1600.

The service chain policy decision point 1600 may be a micro processing computer. For example, the service chain policy decision point 1600 may be one of portable devices such as a general-purpose computer, a customized machine, a mobile phone terminal, or a tablet. The service chain policy decision point 1600 includes a processor 1604, a memory 1606, a communications interface 1602, and a bus 1608. The processor 1604, the memory 1606, and the communications interface 1602 are connected by the bus 1608 and communicate with each other.

The bus 1608 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The bus may be categorized as one or more of an address bus, a data bus, a control bus, or the like. For ease of denotation, the bus in FIG. 16 is denoted by only a bold line. However, this does not mean that only one bus or one type of bus exists.

The memory 1606 is configured to store executable program code, where the program code includes a computer operation instruction. When the service chain policy decision point 1600 executes the program code, the service chain policy decision point 1600 may complete steps 801 and 802 in Embodiment 6, or may implement all functions of the service chain policy decision point 1200 in Embodiment 10. The memory 1606 may include a high speed RAM (Ramdom Access Memory) memory. Optionally, the memory 1606 may further include a non-volatile memory (non-volatile memory). For example, the memory 1606 may include a magnetic disk storage.

The processor 1604 may be a central processing unit (Central Processing Unit, CPU for short), or the processor 1604 may be a specific integrated circuit (Application Specific Integrated Circuit, ASIC for short), or the processor 1604 may be configured as one or more integrated circuits for implementing an embodiment of the present invention.

The processor 1604 is configured to perform operations of orchestrating a service chain according to a requirement of a service chain service, and generating a service chain policy of the service chain, where the service chain policy is used to indicate information required for establishing a tunnel from an ingress SN of the service chain to an egress SN of the service chain and service processing, the service chain policy includes a service chain path identifier of the service chain and a service chain path of the service chain, and the service chain path is used to indicate a chain path from the ingress SN to the egress SN on the service chain.

The communications interface 1602 is configured to send the service chain policy to the egress SN of the service chain according to the service chain path.

Optionally, the service chain policy decision point further includes:

the communications interface 1602 performs an operation of receiving a notification message that is sent by the ingress SN and indicates that the tunnel is established successfully, where the notification message carries the service chain path identifier.

Further, optionally, the service chain-enabled domain network further includes a flow classifier. The flow classifier may be deployed in two manners. It may be an independent device, or may be a same device as the ingress SN (that is, the flow classifier is integrated with the ingress device). The following separately describes the service chain policy decision point in the two deployment manners.

Manner 1: When the flow classifier is an independent device, the service chain policy decision point further includes:

after the communications interface 1602 receives the notification message, the communications interface 1602 is configured to perform an operation of sending flow entry information to the ingress SN, where the flow entry information includes information about the flow classifier, and the flow entry information is forwarded by the ingress SN to the flow classifier and used to establish a pull-in tunnel from the flow classifier to the ingress SN.

Optionally, the communications interface 1602 is further configured to perform an operation of delivering an association message to the flow classifier, where the association message includes an association relationship between the service chain path identifier and a flow steering rule, and the association message is used by the ingress SN to steer a flow of the service chain to the service chain path.

Manner 2: When the flow classifier is integrated with the ingress SN, the service chain policy decision point may further include:

after the communications interface 1602 receives the notification message, the communications interface 1602 is configured to perform an operation of sending an association message to the ingress SN, where the association message includes an association relationship between the service chain path identifier and a flow steering rule, and the association message is used by the ingress SN to steer a flow of the service chain to the service chain path.

It should be noted that, each functional unit of the service chain policy decision point provided by this embodiment of the present invention may be a specific implementation of a function of the apparatus provided by Embodiment 10 based on the method provided by Embodiment 6. Definitions and descriptions of terms keep consistent with those in Embodiment 6 and Embodiment 10. Details are not further described herein again.

As can be seen from above, in some feasible implementations of the present invention, a service chain policy decision point 1600 is disclosed. In the technical solution, the service chain policy decision point 1600 only needs to deliver a service chain policy including a service chain path identifier and a service chain path to an egress SN of a service chain, the service chain policy may be disseminated to an ingress SN of the service chain, and a chain path of the service chain is automatically established. Therefore, automatic service chain deployment is implemented, a service chain deployment operation is simplified, and service chain deployment difficulty is reduced.

The service chain policy decision point 1600 only needs to interact with the egress SN, without delivering the service chain policy to each SN separately, monitoring a route reachability status of each service node, or performing multipoint control and coordination. This reduces objects that interact with the service chain policy decision point, and therefore reduces computation and processing load of the service chain policy decision point. Therefore, operation, administration and maintenance are simple, and extensibility is high.

Figure 17A:
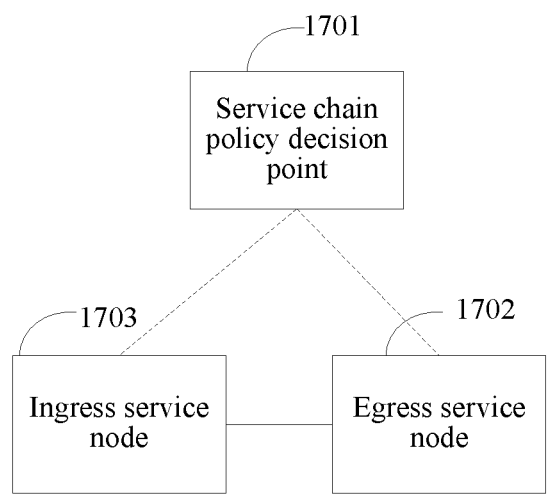
FIG. 17a is a schematic diagram of a service chain-enabled domain network system according to an embodiment of the present invention.

Referring to FIG. 17a, an embodiment of the present invention further provides a service chain-enabled domain network system. The service chain-enabled domain network system includes the service chain policy decision point 1200 provided by Embodiment 10, the egress service node 900 provided by Embodiment 7, and the ingress service node 1100 provided by Embodiment 9.

Figure 17B:
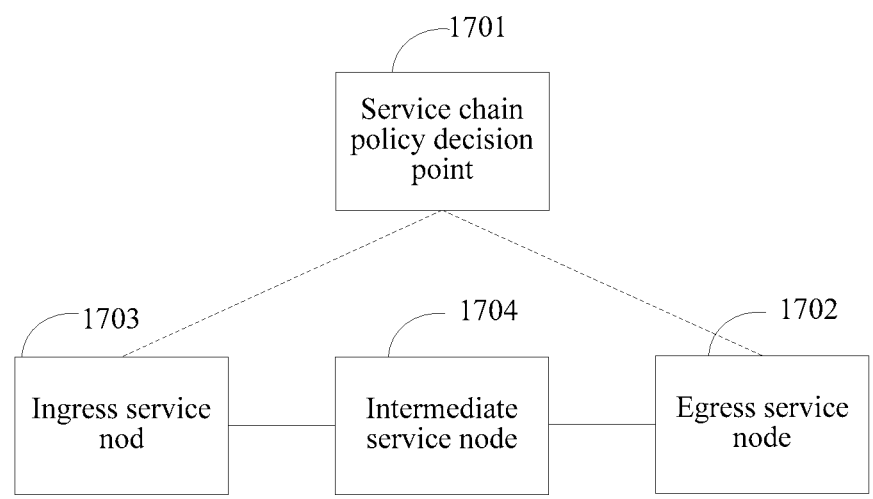
FIG. 17b is a schematic diagram of another service chain-enabled domain network system according to an embodiment of the present invention.

Further, referring to FIG. 17b, optionally, the system further includes the intermediate service node 1000 provided by Embodiment 8.

Alternatively, the service chain-enabled domain network system includes the service chain policy decision point 1600 provided by FIG. 16, the egress service node 1300 provided by FIG. 13, and the ingress service node 1500 provided by FIG. 15.

Further, referring to FIG. 17b, optionally, the system further includes the intermediate service node 1400 provided by FIG. 14.

It should be noted that, for each functional unit of the service chain-enabled domain network system provided by this embodiment of the present invention, refer to related descriptions above.

In the foregoing embodiments, the description of each embodiment has respective focuses. For a part that is not described in detail in an embodiment, refer to related descriptions in other embodiments.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also appreciate that all the embodiments described in the specification are example embodiments, and the related actions and modules are not necessarily mandatory to the present invention.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The method for implementing a service chain, the device, and the system provided by the embodiments of the present invention are described in detail above. The principles and implementations of the present invention are described herein by using specific examples. The description of the embodiments is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limitation to the present invention.

What is claimed is:

1. A method of implementing a service chain in a service chain-enabled domain network, wherein service nodes (SNs) and a service chain path are configured to be deployed in the service chain-enabled domain network, the SNs comprise an ingress SN, an intermediate SN, and an egress SN, and the service chain path comprises a path from the ingress SN to the egress SN through the intermediate SN, the method comprising:

receiving, by the intermediate SN, an extended first Border Gateway Protocol (BGP) packet sent by a downstream SN that is on the service chain path and immediately adjacent to the intermediate SN, wherein the extended first BGP packet comprises a service chain path identifier and a first service chain path, the service chain path identifier identifies the service chain path, and the first service chain path comprises a service chain path from the ingress SN to the intermediate SN;

determining, by the intermediate SN, an upstream SN that is on the first service chain path and immediately adjacent to the intermediate SN; and sending, by the intermediate SN, an extended second BGP packet to the upstream SN, wherein the extended second BGP packet comprises the service chain path identifier and a second service chain path, and the second service chain path comprises a service chain path from the ingress SN to the upstream SN;

wherein after the receiving, by the intermediate SN, the extended first BGP packet sent by the downstream SN, the method further comprises:

establishing, by the intermediate SN, a first tunnel from the intermediate SN to the downstream SN with the downstream SN, and linking the first tunnel to a second tunnel to form one tunnel according to the service chain path identifier, wherein the second tunnel is from the upstream SN to the intermediate SN and established by the upstream SN with the intermediate SN.

2. The method according to claim 1, wherein the extended first BGP packet further comprises a tunnel type, the tunnel type being a label switched path (LSP) tunnel, and wherein the establishing, by the intermediate SN, the first tunnel from the intermediate SN to the downstream SN with the downstream SN, and linking the first tunnel to the second tunnel to form one tunnel according to the service chain path identifier comprises:

obtaining, by the intermediate SN, a first label from the extended first BGP packet, wherein the first label is allocated by the downstream SN to the service chain path identifier, and establishing, by the intermediate SN, the first tunnel with the downstream SN, wherein the first tunnel is an LSP tunnel from the intermediate SN to the downstream SN;

allocating, by the intermediate SN, a second label to the service chain path identifier, and adding the second label to the extended second BGP packet, wherein the second label is used by the upstream SN to establish the second tunnel with the intermediate SN, and the second tunnel is an LSP tunnel from the upstream SN to the intermediate SN; and associating, by the intermediate SN, the second label with the first label according to the service chain path identifier, and generating a label forwarding table to link the first tunnel to the second tunnel to form the one tunnel, wherein the second label is configured to be an incoming label and the first label is configured to be an outgoing label in the label forwarding table.

3. The method according to claim 1, wherein the extended first BGP packet comprises a tunnel type, the tunnel type being a network virtualization over layer 3 (NVO3) tunnel, and wherein the establishing, by the intermediate SN, the first tunnel from the intermediate SN to the downstream SN with the downstream SN, and linking the first tunnel to the second tunnel to form one tunnel according to the service chain path identifier comprises:

obtaining, by the intermediate SN, a first tunnel destination identifier from the extended first BGP packet, wherein the first tunnel destination identifier comprises an IP address of the downstream SN and a first local service chain path identifier allocated by the downstream SN to the service chain path, and establishing, by the intermediate SN, the first tunnel with the downstream SN, wherein the first tunnel is an NVO3 tunnel from the intermediate SN to the downstream SN;

allocating, by the intermediate SN, a second local service chain path identifier to the service chain path, generating a second tunnel destination identifier according to the second local service chain path identifier, and adding the second tunnel destination identifier to the extended second BGP packet, wherein the second tunnel destination identifier comprises an IP address of the intermediate SN and the second local service chain path identifier, the second tunnel destination identifier is used by the upstream SN to establish the second tunnel with the intermediate SN, and the second tunnel is an NVO3 tunnel from the upstream SN to the intermediate SN; and associating, by the intermediate SN, the second tunnel destination identifier with the first tunnel destination identifier according to the service chain path identifier, and generating a forwarding information table to link the first tunnel to the second tunnel to form the one tunnel.

4. The method according to claim 3, wherein the NVO3 tunnel is a virtual extensible local area network (VXLAN) tunnel or a network virtualization using generic routing encapsulation (NVGRE) tunnel, and wherein the method further comprises:

receiving, by the intermediate SN, a service data packet of the service chain that is sent by the upstream SN, terminating a tunnel encapsulation header of the second tunnel in the service data packet, and reencapsulating a tunnel encapsulation header of the first tunnel, wherein a specific field of the tunnel encapsulation header of the first tunnel is filled with the first local service chain path identifier, wherein, when the tunnel type is the VXLAN tunnel, the filled specific field is a VXLAN network identifier (VNI) field of a VXLAN header, and when the tunnel type is an NVGRE tunnel, the filled specific field is a virtual subnet identifier (VSI) field of an NVGRE header.

5. The method according to claim 3, wherein the extended first BGP packet carries extended network layer reachability information (NLRI) including a length field, a tunnel destination identifier field, and a service chain policy field, wherein the tunnel destination identifier field comprises at least a local service chain identifier field carrying the first local service chain path identifier and a destination IP address field carrying the IP address of the downstream SN, and wherein the service chain policy field comprises a service chain path identifier field carrying the service chain path identifier and a service chain path sequence field carrying the first service chain path.

6. A service node (SN) in a service chain-enabled domain network, wherein SNs and a service chain path are configured to be deployed in the service chain-enabled domain network, the SNs comprises the SN as an intermediate SN, an ingress SN, and an egress SN, and the service chain path comprises a path from the ingress SN to the egress SN through the intermediate SN, the intermediate SN comprising:

a communications interface configured to receive an extended first Border Gateway Protocol (BGP) packet sent by a downstream SN that is on the service chain path and immediately adjacent to the intermediate SN, wherein the extended first BGP packet comprises a service chain path identifier and a first service chain path, the service chain path identifier identifies the service chain path, and the first service chain path comprises a service chain path from the ingress SN to the intermediate SN;

at least one processor; and a non-transitory computer-readable storage medium coupled to the at least one processor and storing programming instructions for execution by the at least one processor, wherein the programming instructions instruct the at least one processor to: determine an upstream SN that is on the first service chain path and immediately adjacent to the SN, wherein the communications interface is configured to send an extended second BGP packet to the upstream SN, and wherein the extended second BGP packet comprises the service chain path identifier and a second service chain path, and the second service chain path comprises a service chain path from the ingress SN to the upstream SN;

wherein the at least one processor is configured to: after the communications interface receives the extended first BGP packet, establish a first tunnel from the intermediate SN to the downstream SN with the downstream SN, and link the first tunnel to a second tunnel to form one tunnel according to the service chain path identifier, wherein the second tunnel is from the upstream SN to the intermediate SN and established by the upstream SN with the intermediate SN.

7. The service node according to claim 6, wherein the first service chain path is the service chain path from the ingress SN to the intermediate SN, and the second service chain path is the service chain path from the ingress SN to the upstream SN.

8. The service node according to claim 6, wherein the first service chain path is a service chain path from the ingress SN to the egress SN, and the second service chain path is the service chain path from the ingress SN to the egress SN.

9. The service node according to claim 6, wherein the extended first BGP packet further comprises a tunnel type, the tunnel type being a label switched path (LSP) tunnel, and wherein the programming instructions instruct at least one processor to:

obtain a first label from the extended first BGP packet, wherein the first label is allocated by the downstream SN to the service chain path identifier;

establish the first tunnel with the downstream SN, wherein the first tunnel is an LSP tunnel from the intermediate SN to the downstream SN;

allocate a second label to the service chain path identifier and add the second label to the extended second BGP packet, wherein the second label is used by the upstream SN to establish the second tunnel with the intermediate SN, and the second tunnel is an LSP tunnel from the upstream SN to the intermediate SN; and associate the second label with the first label according to the service chain path identifier and generate a label forwarding table to link the first tunnel to the second tunnel to form the one channel, wherein the second label is configured to be an incoming label and the first label is configured to be an outgoing label in the label forwarding table.

10. The service node according to claim 6, wherein the extended first BGP packet further comprises a tunnel type, the tunnel type being a network virtualization over layer 3 NVO3 tunnel, and wherein the programming instructions instruct the at least one processor to:

obtain a first tunnel destination identifier from the extended first BGP packet, wherein the first tunnel destination identifier comprises an IP address of the downstream SN and a first local service chain path identifier allocated by the downstream SN to the service chain path;

establish the first tunnel with the downstream SN, wherein the first tunnel is an NVO3 tunnel from the intermediate SN to the downstream SN;

allocate a second local service chain path identifier to the service chain path, generate a second tunnel destination identifier according to the second local service chain path identifier, and add the second tunnel destination identifier to the extended second BGP packet, wherein the second tunnel destination identifier comprises an IP address of the intermediate SN and the second local service chain path identifier, the second tunnel destination identifier is used by the upstream SN to establish the second tunnel with the intermediate SN, and the second tunnel is an NVO3 tunnel from the upstream SN to the intermediate SN; and associate the second tunnel destination identifier with the first tunnel destination identifier according to the service chain path identifier and generate a forwarding information table to link the first tunnel to the second tunnel to form the one tunnel.

11. The service node according to claim 10, wherein the NVO3 tunnel is one of a virtual extensible local area network VXLAN tunnel or a network virtualization using generic routing encapsulation NVGRE tunnel, wherein the communications interface is configured to receive a service data packet of the service chain that is sent by the upstream SN, terminate a tunnel encapsulation header of the second tunnel in the service data packet, and reencapsulate a tunnel encapsulation header of the first tunnel, wherein a specific field of the tunnel encapsulation header of the first tunnel is filled with the first local service chain path identifier, and wherein, when the tunnel type is a VXLAN tunnel, the filled specific field is a VXLAN network identifier (VNI) field of a VXLAN header, and when the tunnel type is an NVGRE tunnel, the filled specific field is a virtual subnet identifier (VSI) field of an NVGRE header.

12. A service chain policy decision point in a service chain-enabled domain network, comprising:
at least one processor;
a non-transitory computer-readable storage medium coupled to the at least one processor and storing programming instructions for execution by the at least one processor, wherein the programming instructions instruct the at least one processor to:
orchestrate a service chain according to a requirement of a service chain service, and
generate a service chain policy of the service chain, wherein the service chain policy indicates information for establishing a tunnel from an ingress SN of the service chain to an egress SN of the service chain and service processing, and wherein the service chain policy comprises a service chain path identifier of the service chain and a service chain path of the service chain, and the service chain path indicates a chain path from the ingress SN to the egress SN on the service chain; and
a communications interface configured to send the service chain policy to the egress SN of the service chain according to the service chain path;
wherein the communications interface is configured to:
receive a notification message that is sent by the ingress SN and indicates that the tunnel is established successfully, wherein the notification message carries the service chain path identifier.

13. The service chain policy decision point according to claim 12, wherein the service chain-enabled domain network further comprises a flow classifier, and
wherein, after the communications interface receives the notification message, the communications interface is further configured to send flow entry information to the ingress SN, wherein the flow entry information comprises information about the flow classifier and is forwarded by the ingress SN to the flow classifier and used to establish a pull-in tunnel from the flow classifier to the ingress SN.

14. The service chain policy decision point according to claim 12, wherein the service chain-enabled domain network further comprises a flow classifier, and the flow classifier is integrated with the ingress SN, and
wherein, after the communications interface receives the notification message, the communications interface is further configured to send an association message to the ingress SN, wherein the association message comprises an association relationship between the service chain path identifier and a flow steering rule, and the association message is used by the ingress SN to steer a flow of the service chain to the service chain path.

15. A service chain-enabled domain network system, comprising:
a service chain policy decision point configured to:
orchestrate a service chain according to a requirement of a service chain service and generate a service chain policy of the service chain, wherein the service chain policy indicates information for establishing a tunnel from an ingress service node (SN) of the service chain to an egress SN of the service chain and service processing, wherein the service chain policy comprises a service chain path identifier of the service chain and a first service chain path of the service chain, and wherein the first service chain path indicates a chain path from the ingress SN to the egress SN on the service chain; and
send the service chain policy to the egress SN of the service chain according to the service chain path;
the egress SN configured to:
obtain the service chain path identifier and the first service chain path, wherein the service chain path identifier identifies the first service chain path;
determine an upstream SN that is on the first service chain path and immediately adjacent to the egress SN; and
send an extended first Border Gateway Protocol (BGP) packet to the upstream SN, wherein the extended first BGP packet comprises the service chain path identifier and a second service chain path, and the second service chain path comprises a service chain path from the ingress SN to the upstream SN;
the ingress SN configured to:
receive an extended second BGP packet sent by a downstream SN that is on the service chain path and immediately adjacent to the ingress SN, wherein the extended second BGP packet comprises the service chain path identifier and a third service chain path, the third service chain path comprises the ingress SN;
establish a tunnel from the ingress SN to the downstream SN with the downstream SN; and
send a notification message to the service chain policy decision point after the tunnel from the ingress SN to the downstream SN is established successfully, wherein the notification message carries the service chain path identifier;
the service chain-enabled domain network system, further comprising an intermediate SN configured to:
receive an extended third Border Gateway Protocol BGP packet sent by a downstream SN that is on the service chain path and immediately adjacent to the intermediate SN, wherein the extended third BGP packet comprises the service chain path identifier and a fourth service chain path, and the fourth service chain path comprises a service chain path from the ingress SN to the intermediate SN;
determine an upstream SN that is on the first service chain path and immediately adjacent to the SN;
send an extended fourth BGP packet to the upstream SN, wherein the extended fourth BGP packet comprises the service chain path identifier and a fifth service chain path, and the fifth service chain path comprises a service chain path from the ingress SN to the upstream SN; and
after receiving the extended third BGP packet, establish a first tunnel from the intermediate SN to the downstream SN with the downstream SN and link the first tunnel to a second tunnel to form one tunnel according to the service chain path identifier, wherein the second tunnel is from the upstream SN to the intermediate SN and established by the upstream SN with the intermediate SN.

* * * * *